United States Patent [19]

Manning et al.

[11] Patent Number: 5,781,533
[45] Date of Patent: Jul. 14, 1998

[54] LINK BUFFER SHARING METHOD AND APPARATUS

[75] Inventors: Thomas A. Manning, Northboro; Stephen A. Hauser, Burlington; Stephen A. Caldara, Sudbury; Raymond L. Strouble, Charlton; Douglas H. Hunt, Sudbury, all of Mass.

[73] Assignees: Fujitsu Network Communications, Inc., Richardson, Tex.; Fujitsu Limited, Kawasaki, Japan

[21] Appl. No.: 847,658

[22] Filed: Apr. 22, 1997

Related U.S. Application Data

[63] Continuation of Ser. No. 609,500, Mar. 1, 1996, abandoned.

[60] Provisional application No. 60/001,498 Jul. 19, 1995.

[51] Int. Cl.$^6$ ............................................. H04L 12/56
[52] U.S. Cl. ........................... 370/236; 370/252; 370/429
[58] Field of Search ............................. 370/229, 235, 370/236, 252, 428, 429, 230, 412

[56] References Cited

U.S. PATENT DOCUMENTS

| | | | |
|---|---|---|---|
| 3,804,991 | 4/1974 | Hammond et al. | 179/26 |
| 3,974,343 | 8/1976 | Cheney et al. | 179/18 ES |
| 4,069,399 | 1/1978 | Barrett et al. | 179/15 AL |
| 4,603,382 | 7/1986 | Cole et al. | 364/200 |
| 4,715,030 | 12/1987 | Koch et al. | 370/85 |
| 4,727,537 | 2/1988 | Nichols | 370/85 |
| 4,737,953 | 4/1988 | Koch et al. | 370/94 |
| 4,797,881 | 1/1989 | Ben-Artzi | 370/88 |
| 4,821,034 | 4/1989 | Anderson et al. | 340/825.8 |
| 4,837,761 | 6/1989 | Isono et al. | 370/60 |
| 4,849,968 | 7/1989 | Turner | 370/94 |
| 4,870,641 | 9/1989 | Pattavina | 370/60 |
| 4,872,159 | 10/1989 | Hemmady et al. | 370/60 |
| 4,872,160 | 10/1989 | Hemmady et al. | 370/60 |

(List continued on next page.)

FOREIGN PATENT DOCUMENTS 484943  3/1992  Japan ..................... A61B 8/00

OTHER PUBLICATIONS

Head of Line Arbitration in ATM Switches With Input–Output Buffering and Backpressure Control. By Hosein F. Badran and H. T. Mouftah. *Globecom '91*, pp. 0347–0351.
An Ascom Timeplex White Paper. Meeting Critical Requirements with Scalable Enterprise Networking Solutions Based on a Unified ATM Foundation. pp. 1–12, Apr. 1994.
Douglas H. Hunt, ATM Traffic Management—Another Perspective. *Business Communications Review*, Jul. 1994.
Richard Bubenik et al., Leaf Initiated Join Extensions. Technical Committee, Signalling Subworking Group, ATM Forum/94–0325R1, Jul. 1, 1994.
Douglas H. Hunt et al., Flow Controlled Virtual Connections Proposal for ATM Traffic Management (Revision R2). Traffic Management Subworking Group, ATM_Forum/94–0632R2, Aug. 1994.
Flavio Bonomi et al., The Rate–Based Flow Control Framework for the Available Bit Rate ATM Service, *IEEE Network*, Mar./Apr. 1995, pp. 25–39.
R. Jain, Myths About Congestion Management in High Speed Networks, *Internetworking Research and Experience*, vol. 3, 101–113 (1992).

(List continued on next page.)

*Primary Examiner*—Chi H. Pham
*Assistant Examiner*—Ricky Q. Ngo
*Attorney, Agent, or Firm*—Weingarten, Schurgin, Gagnebin & Hayes LLP

[57] ABSTRACT

A method and apparatus for providing buffer state accounting at a link level, otherwise known as link flow control, in addition to flow control at the virtual connection level. Link flow control enables receiver cell buffer sharing while maintaining per-connection bandwidth with lossless cell transmission. High link level update frequency is enabled without a significant sacrifice in overall link forward bandwidth. A higher and thus more efficient utilization of receiver cell buffers is achieved.

82 Claims, 15 Drawing Sheets

U.S. PATENT DOCUMENTS

| | | | |
|---|---|---|---|
| 4,878,216 | 10/1989 | Yunoki | 370/60 |
| 4,893,302 | 1/1990 | Hemmady et al. | 370/60 |
| 4,893,307 | 1/1990 | McKay et al. | 370/94.1 |
| 4,894,824 | 1/1990 | Hemmady et al. | 370/58.3 |
| 4,897,841 | 1/1990 | Gang, Jr. | 370/85.13 |
| 4,899,333 | 2/1990 | Roediger | 370/60 |
| 4,920,531 | 4/1990 | Isono et al. | 370/60 |
| 4,922,503 | 5/1990 | Leone | 370/85.13 |
| 4,933,938 | 6/1990 | Sheehy | 370/85.13 |
| 4,947,390 | 8/1990 | Sheehy | 370/85.13 |
| 4,953,157 | 8/1990 | Franklin et al. | 370/60 |
| 4,956,839 | 9/1990 | Torii et al. | 370/60 |
| 4,958,341 | 9/1990 | Hemmady et al. | 370/60.1 |
| 4,979,100 | 12/1990 | Makris et al. | 364/200 |
| 4,993,018 | 2/1991 | Hajikano et al. | 370/60 |
| 5,021,949 | 6/1991 | Morten et al. | 364/200 |
| 5,029,164 | 7/1991 | Goldstein et al. | 370/95.1 |
| 5,060,228 | 10/1991 | Tsutsui et al. | 370/85.13 |
| 5,067,123 | 11/1991 | Hyodo et al. | 370/58.1 |
| 5,070,498 | 12/1991 | Kakuma et al. | 370/60 |
| 5,083,269 | 1/1992 | Syobatake et al. | 395/425 |
| 5,084,867 | 1/1992 | Tachibana et al. | 370/60 |
| 5,084,871 | 1/1992 | Carn et al. | 370/94.1 |
| 5,090,011 | 2/1992 | Fukuta et al. | 370/60 |
| 5,090,024 | 2/1992 | Vander Mey et al. | 375/1 |
| 5,093,912 | 3/1992 | Dong et al. | 395/650 |
| 5,115,429 | 5/1992 | Hluchyj et al. | 370/84 |
| 5,119,369 | 6/1992 | Tanabe et al. | 370/60 |
| 5,119,372 | 6/1992 | Verbeek | 370/85.3 |
| 5,128,932 | 7/1992 | Li | 370/60 |
| 5,130,975 | 7/1992 | Akata | 370/60 |
| 5,130,982 | 7/1992 | Ash et al. | 370/85.7 |
| 5,132,966 | 7/1992 | Hayano et al. | 370/79 |
| 5,146,474 | 9/1992 | Nagler et al. | 375/10 |
| 5,146,560 | 9/1992 | Goldberg et al. | 385/200 |
| 5,150,358 | 9/1992 | Punj et al. | 370/84 |
| 5,151,897 | 9/1992 | Suzuki | 370/85.13 |
| 5,157,657 | 10/1992 | Potter et al. | 370/85 |
| 5,163,045 | 11/1992 | Caram et al. | 370/60.1 |
| 5,163,046 | 11/1992 | Hahne et al. | 370/79 |
| 5,179,556 | 1/1993 | Turner | 370/94.1 |
| 5,179,558 | 1/1993 | Thacker et al. | 370/94.1 |
| 5,185,743 | 2/1993 | Murayama et al. | 370/110.1 |
| 5,191,582 | 3/1993 | Upp | 370/94.1 |
| 5,191,652 | 3/1993 | Dias et al. | 395/200 |
| 5,193,151 | 3/1993 | Jain | 395/200 |
| 5,197,067 | 3/1993 | Fujimoto et al. | 370/94.1 |
| 5,198,808 | 3/1993 | Kudo | 340/825.8 |
| 5,199,027 | 3/1993 | Barri | 370/60 |
| 5,239,539 | 8/1993 | Uchida et al. | 370/58.3 |
| 5,253,247 | 10/1993 | Hirose et al. | 370/14 |
| 5,253,248 | 10/1993 | Dravida et al. | 370/16 |
| 5,255,264 | 10/1993 | Cotton et al. | 370/24 |
| 5,255,266 | 10/1993 | Watanabe et al. | 370/60.1 |
| 5,257,311 | 10/1993 | Naito et al. | 380/48 |
| 5,258,979 | 11/1993 | Oomuro et al. | 370/95.1 |
| 5,265,088 | 11/1993 | Takigawa et al. | 370/15 |
| 5,267,232 | 11/1993 | Katsube et al. | 370/17 |
| 5,268,897 | 12/1993 | Komine et al. | 370/60 |
| 5,271,010 | 12/1993 | Miyake et al. | 370/94.1 |
| 5,272,697 | 12/1993 | Fraser et al. | 370/61 |
| 5,274,641 | 12/1993 | Shobatake et al. | 370/94.1 |
| 5,274,768 | 12/1993 | Traw et al. | 395/275 |
| 5,280,469 | 1/1994 | Taniguchi et al. | 370/13 |
| 5,280,470 | 1/1994 | Buhrke et al. | 370/13 |
| 5,282,201 | 1/1994 | Frank et al. | 370/94.1 |
| 5,283,788 | 2/1994 | Morita et al. | 370/110.1 |
| 5,285,446 | 2/1994 | Yonehara | 370/60.1 |
| 5,287,349 | 2/1994 | Hyodo et al. | 370/60.1 |
| 5,287,535 | 2/1994 | Sakagawa et al. | 370/60 |
| 5,289,462 | 2/1994 | Ahmadi et al. | 370/60.1 |
| 5,289,463 | 2/1994 | Mobasser | 370/68.1 |
| 5,289,470 | 2/1994 | Chang et al. | 370/94.1 |
| 5,291,481 | 3/1994 | Doshi et al. | 370/60 |
| 5,291,482 | 3/1994 | McHarg et al. | 370/60 |
| 5,295,134 | 3/1994 | Yoshimura et al. | 370/16 |
| 5,301,055 | 4/1994 | Bagchi et al. | 359/139 |
| 5,301,184 | 4/1994 | Uriu et al. | 370/60 |
| 5,301,190 | 4/1994 | Tsukuda et al. | 370/66 |
| 5,301,193 | 4/1994 | Toyofuku et al. | 370/94.1 |
| 5,303,232 | 4/1994 | Proctor et al. | 370/94 |
| 5,305,311 | 4/1994 | Lyles | 370/60 |
| 5,309,431 | 5/1994 | Tominaga et al. | 370/60 |
| 5,309,438 | 5/1994 | Nakajima | 370/94.1 |
| 5,311,586 | 5/1994 | Bogart et al. | 379/221 |
| 5,313,454 | 5/1994 | Bustini et al. | 370/13 |
| 5,313,458 | 5/1994 | Suzuki | 370/56 |
| 5,315,586 | 5/1994 | Charvillat | 370/60 |
| 5,319,638 | 6/1994 | Lin | 370/60 |
| 5,321,695 | 6/1994 | Faulk, Jr. | 370/60 |
| 5,323,389 | 6/1994 | Bitz et al. | 370/60.1 |
| 5,333,131 | 7/1994 | Tanabe et al. | 370/54 |
| 5,333,134 | 7/1994 | Ishibashi et al. | 370/94.1 |
| 5,335,222 | 8/1994 | Kamoi et al. | 370/60 |
| 5,335,325 | 8/1994 | Frank et al. | 395/200 |
| 5,339,310 | 8/1994 | Taniguchi | 370/60 |
| 5,339,317 | 8/1994 | Tanaka et al. | 370/85.15 |
| 5,339,318 | 8/1994 | Tanaka et al. | 370/110.1 |
| 5,341,366 | 8/1994 | Soumiya et al. | 370/17 |
| 5,341,373 | 8/1994 | Ishibashi et al. | 370/85.9 |
| 5,341,376 | 8/1994 | Yamashita | 370/99 |
| 5,345,229 | 9/1994 | Olnowich et al. | 340/825.8 |
| 5,350,906 | 9/1994 | Brody et al. | 235/379 |
| 5,355,372 | 10/1994 | Sengupta et al. | 370/60 |
| 5,357,506 | 10/1994 | Sugawara | 370/60 |
| 5,357,507 | 10/1994 | Hughes et al. | 370/60 |
| 5,357,508 | 10/1994 | Le Boudec et al. | 370/58.3 |
| 5,357,510 | 10/1994 | Norizuki et al. | 370/60.1 |
| 5,359,600 | 10/1994 | Ueda et al. | 370/60.1 |
| 5,361,251 | 11/1994 | Aihara et al. | 370/60 |
| 5,361,372 | 11/1994 | Rege et al. | 395/800 |
| 5,363,433 | 11/1994 | Isono | 379/92 |
| 5,365,514 | 11/1994 | Hershey et al. | 370/17 |
| 5,371,893 | 12/1994 | Price et al. | 395/725 |
| 5,373,504 | 12/1994 | Tanaka et al. | 370/60.1 |
| 5,375,117 | 12/1994 | Morita et al. | 370/79 |
| 5,377,262 | 12/1994 | Bales et al. | 379/220 |
| 5,377,327 | 12/1994 | Jain et al. | 395/200 |
| 5,379,297 | 1/1995 | Glover et al. | 370/60.1 |
| 5,379,418 | 1/1995 | Shimazaki et al. | 395/575 |
| 5,390,170 | 2/1995 | Sawant et al. | 370/58.1 |
| 5,390,174 | 2/1995 | Jugel | 370/60 |
| 5,390,175 | 2/1995 | Hiller et al. | 370/60 |
| 5,392,280 | 2/1995 | Zheng | 370/60 |
| 5,392,402 | 2/1995 | Robrock, II | 395/200 |
| 5,394,396 | 2/1995 | Yoshimura et al. | 370/60 |
| 5,398,235 | 3/1995 | Tsuzuki et al. | 370/16 |
| 5,400,337 | 3/1995 | Munte | 370/60.1 |
| 5,402,415 | 3/1995 | Turner | 370/60 |
| 5,412,648 | 5/1995 | Fan | 370/60 |
| 5,414,703 | 5/1995 | Sakaue et al. | 370/60 |
| 5,420,858 | 5/1995 | Marshall et al. | 370/60.1 |
| 5,420,988 | 5/1995 | Elliott | 395/275 |
| 5,422,879 | 6/1995 | Parsons et al. | 370/60 |
| 5,425,021 | 6/1995 | Derby et al. | 370/54 |
| 5,425,026 | 6/1995 | Mori | 370/60 |
| 5,432,713 | 7/1995 | Takeo et al. | 364/514 |
| 5,432,784 | 7/1995 | Ozveren | 370/60.1 |
| 5,432,785 | 7/1995 | Ahmed et al. | 370/60.1 |
| 5,432,908 | 7/1995 | Heddes et al. | 395/250 |
| 5,436,886 | 7/1995 | McGill | 370/16 |
| 5,436,893 | 7/1995 | Barnett | 370/60.1 |

| | | | |
|---|---|---|---|
| 5,440,547 | 8/1995 | Esaki et al. | 370/60 |
| 5,444,702 | 8/1995 | Burnett et al. | 370/60.1 |
| 5,446,733 | 8/1995 | Tsuruoka | 370/60.1 |
| 5,446,737 | 8/1995 | Cidon et al. | 370/85.5 |
| 5,446,738 | 8/1995 | Kim et al. | 370/94.2 |
| 5,448,559 | 9/1995 | Hayter et al. | 370/60.1 |
| 5,450,406 | 9/1995 | Esaki et al. | 370/60.1 |
| 5,452,296 | 9/1995 | Shimizu | 370/60.1 |
| 5,455,820 | 10/1995 | Yamada | 370/17 |
| 5,455,825 | 10/1995 | Lauer et al. | 370/60 |
| 5,457,687 | 10/1995 | Newman | 370/85.3 |
| 5,459,743 | 10/1995 | Fukuda et al. | 371/67.1 |
| 5,461,611 | 10/1995 | Drake, Jr. et al. | 370/54 |
| 5,465,331 | 11/1995 | Yang et al. | 395/200.08 |
| 5,475,679 | 12/1995 | Munter | 370/58.2 |
| 5,479,401 | 12/1995 | Bitz et al. | 370/60.1 |
| 5,479,402 | 12/1995 | Hata et al. | 370/60.1 |
| 5,483,526 | 1/1996 | Ben-Nun et al. | 370/60.1 |
| 5,485,453 | 1/1996 | Wahlman et al. | 370/16 |
| 5,485,455 | 1/1996 | Dobbins et al. | 370/60 |
| 5,487,063 | 1/1996 | Kakuma et al. | 370/56 |
| 5,488,606 | 1/1996 | Kakuma et al. | 370/16 |
| 5,491,691 | 2/1996 | Shtayer et al. | 370/61 |
| 5,491,694 | 2/1996 | Oliver et al. | 370/85.4 |
| 5,493,566 | 2/1996 | Ljungberg et al. | 370/60 |
| 5,497,369 | 3/1996 | Wainwright | 370/60 |
| 5,499,238 | 3/1996 | Shon | 370/60.2 |
| 5,504,741 | 4/1996 | Yamanaka et al. | 370/58.2 |
| 5,504,742 | 4/1996 | Kakuma et al. | 370/60.1 |
| 5,506,834 | 4/1996 | Sekihata et al. | 370/17 |
| 5,506,839 | 4/1996 | Hatta | 370/60 |
| 5,506,956 | 4/1996 | Cohen | 395/182.04 |
| 5,509,001 | 4/1996 | Tachibana et al. | 370/17 |
| 5,509,007 | 4/1996 | Takashima et al. | 370/60.1 |
| 5,513,134 | 4/1996 | Cooperman et al. | 365/49 |
| 5,513,178 | 4/1996 | Tanaka | 370/58.2 |
| 5,513,180 | 4/1996 | Miyake et al. | 370/60.1 |
| 5,515,359 | 5/1996 | Zheng | 370/13 |
| 5,519,690 | 5/1996 | Suzuka et al. | 370/17 |
| 5,521,905 | 5/1996 | Oda et al. | 370/17 |
| 5,521,915 | 5/1996 | Dieudonne et al. | 370/60.1 |
| 5,521,916 | 5/1996 | Choudhury et al. | 370/60.1 |
| 5,521,917 | 5/1996 | Watanabe et al. | 370/1 |
| 5,521,923 | 5/1996 | Willmann et al. | 370/94.1 |
| 5,523,999 | 6/1996 | Takano et al. | 370/58.2 |
| 5,524,113 | 6/1996 | Gaddis | 370/60.1 |
| 5,526,344 | 6/1996 | Diaz et al. | 370/16 |
| 5,528,588 | 6/1996 | Bennett et al. | 370/60 |
| 5,528,590 | 6/1996 | Iidaka et al. | 370/60.1 |
| 5,528,591 | 6/1996 | Lauer | 370/60.1 |
| 5,530,695 | 6/1996 | Dighe et al. | 370/17 |
| 5,533,009 | 7/1996 | Chen | 370/17 |
| 5,533,020 | 7/1996 | Byrn et al. | 370/60.1 |
| 5,535,196 | 7/1996 | Aihara et al. | 370/60 |
| 5,535,197 | 7/1996 | Cotton | 370/60 |
| 5,537,394 | 7/1996 | Abe et al. | 370/17 |
| 5,541,912 | 7/1996 | Choudhury et al. | 370/17 |
| 5,544,168 | 8/1996 | Jeffrey et al. | 370/60.1 |
| 5,544,169 | 8/1996 | Norizuki et al. | 370/60.1 |
| 5,544,170 | 8/1996 | Kasahara | 370/84 |
| 5,546,389 | 8/1996 | Wippenbeck et al. | 370/60 |
| 5,546,391 | 8/1996 | Hochschild et al. | 370/60 |
| 5,546,392 | 8/1996 | Boal et al. | 370/60.1 |
| 5,550,821 | 8/1996 | Akiyoshi | 370/60.1 |
| 5,553,057 | 9/1996 | Nakayama | 370/13 |
| 5,553,068 | 9/1996 | Aso et al. | 370/60 |
| 5,555,243 | 9/1996 | Kakuma et al. | 370/58.2 |
| 5,555,265 | 9/1996 | Kakuma et al. | 370/60 |
| 5,557,607 | 9/1996 | Holden | 370/58.2 |
| 5,568,479 | 10/1996 | Watanabe et al. | 370/60.1 |
| 5,570,361 | 10/1996 | Norizuki et al. | 370/60.1 |
| 5,570,362 | 10/1996 | Nishimura | 370/60.1 |
| 5,573,522 | 11/1996 | Calamvokis et al. | 370/60.1 |
| 5,577,032 | 11/1996 | Sone et al. | 370/58.3 |
| 5,577,035 | 11/1996 | Hayter et al. | 370/60 |
| 5,583,857 | 12/1996 | Soumiya et al. | 370/233 |
| 5,583,858 | 12/1996 | Hanaoka | 370/392 |
| 5,583,861 | 12/1996 | Holden | 370/395 |
| 5,590,132 | 12/1996 | Ishibashi et al. | 370/236 |
| 5,602,829 | 2/1997 | Nie et al. | 370/235 |
| 5,610,913 | 3/1997 | Tomonaga et al. | 370/219 |
| 5,623,405 | 4/1997 | Isono | 395/230 |
| 5,625,846 | 4/1997 | Kobayakawa et al. | 395/872 |

OTHER PUBLICATIONS

Douglas H. Hunt et al., Credit–Based FCVC Proposal for ATM Traffic Management (Revision R1), ATM Forum Technical Committee Traffic Management Subworking Group, ATM_Forum/94–0168R1, Apr. 28, 1994.

Douglas H. Hunt et al., Action Item Status for Credit–Based FCVC Proposal, ATM Forum Technical Committee Traffic Management Subworking Group, ATM _Forum/94–0439, Apr. 28, 1994.

Timothy P. Donahue et al., Arguments in Favor of Continuing Phase 1 as the Initial ATM Forum P–NNI Routing Protocol Implementation, ATM Forum Technical Committee, ATM Forum/94–0460, Apr. 28, 1994.

Richard Bubenick et al., Leaf Initiated Join Extensions, Technical Committee, Signalling Subworking Group, ATM Forum/94–0325, Apr. 28, 1994.

Rob Coltun et al., PRP: A P–NNI Routing Protocol Proposal, ATM Forum Technical Committee, ATM_Forum/94–0492, Apr. 28, 1994.

Richard Bubenik et al., Leaf Initiated Join Extensions, ATM Forum Technical Committee, Signalling Subworking Group, ATM Forum 94–0325, Apr. 28, 1994.

Richard Bubenik et al., Requirements For Phase 2 Signalling Protocol, ATM Forum Technical Committee, Signalling Subworking Group, ATM Forum 94–1078, Jan. 1, 1994.

SITA, ATM RFP: C–Overall Technical Requirements, Sep. 1994.

H.T. Kung and K. Chang, Receiver–Oriented Adaptive Buffer Allocation in Credit–Based Flow Control for ATM Networks, *Proceedings of INFOCOM '95*, Apr. 2–6, 1995, pp. 1–14.

H.T. Kung et al., Credit–Based Flow Control for ATM Networks: Credit Update Protocol, Adaptive Credit Allocation, and Statistical Multiplexing, *Proceedings of ACM SIGCOMM '94 Symposium on Communications Architectures, Protocols and Applications*, Aug. 31–Sep. 2, 1994, pp. 1–14.

LINK BUFFER SHARING METHOD AND APPARATUS

RELATED APPLICATION

This application is a continuation of application Ser. No. 08/609,500, filed Mar. 1, 1996 now abandoned, which claimed benefit of U.S. provisional application Ser. No. 60/001,498, filed Jul. 19, 1995 now abandoned.

FIELD OF THE INVENTION

This application relates to communications methods and apparatus in a distributed switching architecture, and in particular to buffer sharing methods and apparatus in a distributed switching architecture.

BACKGROUND OF THE INVENTION

A Flow Controlled Virtual Connection (FCVC) protocol for use in a distributed switching architecture is presently known in the art, and is briefly discussed below with reference to FIG. 1. This protocol involves communication of status (buffer allocation and current state) on a per virtual connection, or a per virtual channel, basis between upstream and downstream network elements to provide a "no cell loss" guarantee. A cell is the unit of data to be transmitted. Each cell requires a buffer to store it.

One example of this protocol involves a credit-based flow control system, where a number of connections exist within the same link with the necessary buffers established and flow control monitored on a per-connection basis. Buffer usage over a known time interval, the link round-trip time, is determined in order to calculate the per-connection bandwidth. A trade-off is established between maximum bandwidth and buffer allocation per connection. Such per-connection feedback and subsequent flow control at the transmitter avoids data loss from an inability of the downstream element to receive data cells sent from the upstream element. The flow control protocol isolates each connection, ensuring lossless cell transmission for that connection. However, since buffers reserved for a first connection cannot be made available for (that is, shared with) a second connection without risking cell loss in the first connection, the cost of the potentially enormous number of cell buffers required for long-haul, high-bandwidth links, each supporting a large number of connections, quickly becomes of great significance.

Connection-level flow control results in a trade-off between update frequency and the realized bandwidth for the connection. High update frequency has the effect of minimizing situations in which a large number of receiver cell buffers are available, though the transmitter incorrectly believes the buffers to be unavailable. Thus it reduces the number of buffers that must be set aside for a connection. However, a high update frequency to control a traffic flow will require a high utilization of bandwidth (in the reverse direction) to supply the necessary flow control buffer update information where a large number of connections exist in the same link. Realizing that transmission systems are typically symmetrical with traffic flowing in both directions, and flow control buffer update information likewise flowing in both directions, it is readily apparent that a high update frequency is wasteful of the bandwidth of the link, on the other hand, using a lower update frequency to lower the high cost of this bandwidth loss in the link, in turn requires that more buffers be set aside for each connection. This trade-off can thus be restated as being between more efficient receiver cell buffer usage and a higher cell transmission rate. In practice, given a large number of connections in a given link, it turns out that any compromise results in both too high a cost for buffers and too much bandwidth wasted in the link.

Therefore, presently known cell transfer flow control protocols fail to provide for a minimized receiver cell buffer pool and a high link data transfer efficiency, while simultaneously maintaining the "no cell loss" guarantee on a per-connection basis when a plurality of connections exist in the same link.

SUMMARY OF THE INVENTION

The presently claimed invention provides buffer state flow control at the link level, otherwise known as link flow control, in addition to the flow control on a per-connection basis.

In such a system, link flow control may have a high update frequency, whereas connection flow control information may have a low update frequency. The end result is a low effective update frequency since link level flow control exists only once per link basis whereas the link typically has many connections within it, each needing their own flow control. This minimizes the wasting of link bandwidth to transmit flow control update information. However, since the whole link now has a flow control mechanism ensuring lossless transmission for it and thus for all of the connections within it, buffers may be allocated from a pool of buffers and thus connections may share in access to available buffers. Sharing buffers means that fewer buffers are needed since the projected buffers required for a link in the defined known time interval may be shown to be less than the projected buffers that would be required if independently calculated and summed for all of the connections within the link for the same time interval. Furthermore, the high update frequency that may be used on the link level flow control without undue wasting of link bandwidth, allows further minimization of the buffers that must be assigned to a link. Minimizing the number of cell buffers at the receiver significantly decreases net receiver cost.

The link can be defined either as a physical link or as a logical grouping comprised of logical connections.

The resultant system has eliminated both defects of the presently known art. It eliminates the excessive wasting of link bandwidth that results from reliance on a per-connection flow control mechanism alone, while taking advantage of both a high update frequency at the link level and buffer sharing to minimize the buffer requirements of the receiver. Yet this flow control mechanism still ensures the same lossless transmission of cells as would the prior art.

As an additional advantage of this invention, a judicious use of the counters associated with the link level and connection level flow control mechanisms, allows easy incorporation of a dynamic buffer allocation mechanism to control the number of buffers allocated to each connection, further reducing the buffer requirements.

BRIEF DESCRIPTION OF THE DRAWINGS

The above and further advantages may be more fully understood by referring to the following description and accompanying drawings of which.

DETAILED DESCRIPTION

Figure 1:
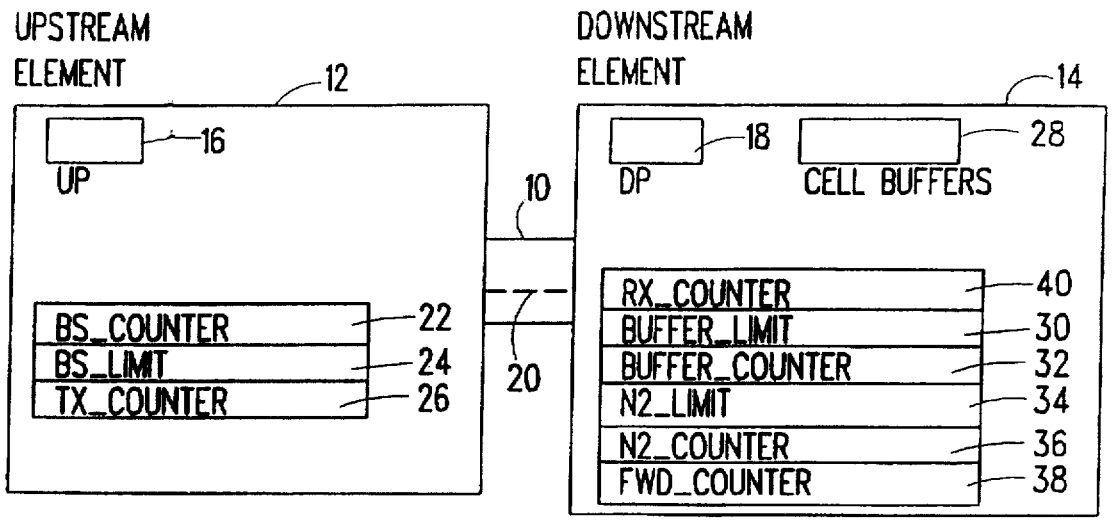
FIG. 1 is a block diagram of a connection-level flow control apparatus as known in the prior art.

In FIG. 1, the resources required for connection-level flow control are presented. As previously stated, the illustrated configuration of FIG. 1 is presently known in the art. However, a brief discussion of a connection-level flow control arrangement will facilitate an explanation of the presently disclosed link-level flow control method and apparatus.

One link 10 is shown providing an interface between an upstream transmitter element 12, also known as an UP subsystem, and a downstream receiver element 14, also known as a DP subsystem. Each element 12, 14 can act as a switch between other network elements. For instance, the upstream element 12 in FIG. 1 can receive data from a PC (not shown). This data is communicated through the link 10 to the downstream element 14, which in turn can forward the data to a device such as a printer (not shown). Alternatively, the illustrated network elements 12, 14 can themselves be network end-nodes.

The essential function of the presently described arrangement is the transfer of data cells from the upstream element 12 via a connection 20 in the link 10 to the downstream element 14, where the data cells are temporarily held in cell buffers 28. Cell format is known, and is further described in "Quantum Flow Control", Version 1.5.1, published Jun. 27, 1995 by the Flow Control Consortium. In FIG. 1, the block labelled Cell Buffers 28 represents a set of cell buffers dedicated to the respective connection 20. Data cells are released from the buffers 28, either through forwarding to another link beyond the downstream element 14, or through cell utilization within the downstream element 14. The latter event can include the construction of data frames from the individual data cells if the downstream element 14 is an endnode such as a work station.

Each of the upstream and downstream elements 12, 14 are controlled by respective processors labelled UP (Upstream Processor) or UP processor 16 and DP (Downstream Processor) or DP processor 18. Associated with each of the processors 16, 18 are sets of buffer counters for implementing the connection-level flow control. These buffer counters are each implemented as an increasing counter/limit register set to facilitate resource usage changes. The counters of FIG. 1, described in further detail below, are implemented in a first embodiment in UP internal RAM.

Within the link 10, which in a first embodiment is a copper conductor, multiple virtual connections 20 are provided. In an alternative embodiment, the link 10 is a logical grouping of plural virtual connections 20. The number of connections 20 implemented within the link 10 depends upon the needs of the respective network elements 12, 14, as well as the required bandwidth per connection. In FIG. 1, only one connection 20 and associated counters are illustrated for simplicity.

First, with respect to the upstream element 12 of FIG. 1, two buffer state controls are provided, BS__Counter 22 and BS__Limit 24. In a first embodiment, each are implemented as fourteen bit counters/registers, allowing a connection to have 16,383 buffers. This number would support, for example, 139 Mbps, 10,000 kilometer round-trip service. The buffer state counters 22, 24 are employed only if the connection 20 in question is flow-control enabled. That is, a bit in a respective connection descriptor, or queue descriptor, of the UP 16 is set indicating the connection 20 is flow-control enabled.

BS__Counter 22 is incremented by the UP 16 each time a data cell is transferred out of the upstream element 12 and through the associated connection 20. Periodically, as described below, this counter 22 is adjusted during an update event based upon information received from the downstream element 14. BS__Counter 22 thus presents an indication of the number of data cells either currently being transmitted in the connection 20 between the upstream and downstream elements 12, 14, or yet unreleased from buffers 28 in the downstream element 14.

BS__Limit 24 is set at connection configuration time to reflect the number of buffers 28 available within the receiver 14 for this connection 20. For instance, if BS__Counter 22 for this connection 20 indicates that twenty data cells have been transmitted and BS__Limit 24 indicates that this connection 20 is limited to twenty receiver buffers 28, the UP 16 will inhibit further transmission from the upstream element 12 until an indication is received from the downstream element 14 that further buffer space 28 is available for that connection 20.

Tx__Counter 26 is used to count the total number of data cells transmitted by the UP 16 through this connection 20. In the first embodiment, this is a twenty-eight bit counter which rolls over at 0xFFFFFFF. As described later, Tx__Counter 16 is used during a check event to account for errored cells for this connection 20.

In the downstream element 14, the DP 18 also manages a set of counters for each connection 20. Buffer__Limit 30 performs a policing function in the downstream element 14 to protect against misbehaving transmitters. Specifically, the buffer__limit register 30 indicates the maximum number of cell buffers 28 in the receiver 14 which this connection 20 can use. In most cases, BS__Limit 24 is equal to Buffer__Limit 30. At some point, though, it may be necessary to adjust the maximum number of cell buffers 28 for this connection 20 up or down. This function is coordinated by network management software. To avoid the "dropping" of data cells in transmission, an increase in buffers per connection is reflected first in Buffer__Limit 30 prior to BS__Limit 24. Conversely, a reduction in the number of receiver buffers per connection is reflected first in BS__Limit 24 and thereafter in Buffer__Limit 30.

Buffer__Counter 32 provides an indication of the number of buffers 28 in the downstream element 14 which are currently being used for the storage of data cells. As described subsequently, this value is used in providing the upstream element 12 with a more accurate picture of buffer availability in the downstream element 14. Both the Buffer__

Limit 30 and Buffer_Counter 32 are fourteen bits wide in the first embodiment.

N2_Limit 34 determines the frequency of connection flow-rate communication to the upstream transmitter 12. A cell containing such flow-rate information is sent upstream every time the receiver element 14 forwards a number of cells equal to N2_Limit 34 out of the receiver element 14. This updating activity is further described subsequently. In the first embodiment, N2_Limit 34 is six bits wide.

The DP 18 uses N2_Counter 36 to keep track of the number of cells which have been forwarded out of the receiver element 14 since the last time the N2_Limit 34 was reached. In the first embodiment, N2_Counter 36 is six bits wide.

In a first embodiment of the present invention, the DP 18 maintains Fwd_Counter 38 to maintain a running count of the total number of cells forwarded through the receiver element 14. This includes buffers released when data cells are utilized for data frame construction in an end-node. When the maximum count for this counter 38 is reached, the counter rolls over to zero and continues. The total number of cells received by the receiver element 14 can be derived by adding Buffer_Counter 32 to Fwd_Counter 38. The latter is employed in correcting the transmitter element 12 for errored cells during the check event, as described below. Fwd_Counter 38 is twenty-eight bits wide in the first embodiment.

In a second embodiment of the present invention, the DP 18 maintains Rx_Counter 40, a counter which is incremented each time the downstream element 14 receives a data cell through the respective connection 20. The value of this counter 40 is then usable directly in response to check cells and in the generation of an update cell, both of which will be described further below. Similar to the Fwd_Counter 38, Rx_Counter 40 is twenty-eight bits wide in this second embodiment.

There are two events in addition to a steady state condition in the connection-level flow controlled protocol: update; and check. In steady state, data cells are transmitted from the transmitter element 12 to the receiver element 14. In update, buffer occupancy information is returned upstream by the receiver element 14 to correct counter values in the transmitter element 12. Check mode is used to check for cells lost or injected due to transmission errors between the upstream transmitter and downstream receiver elements 12, 14.

Figure 3A:
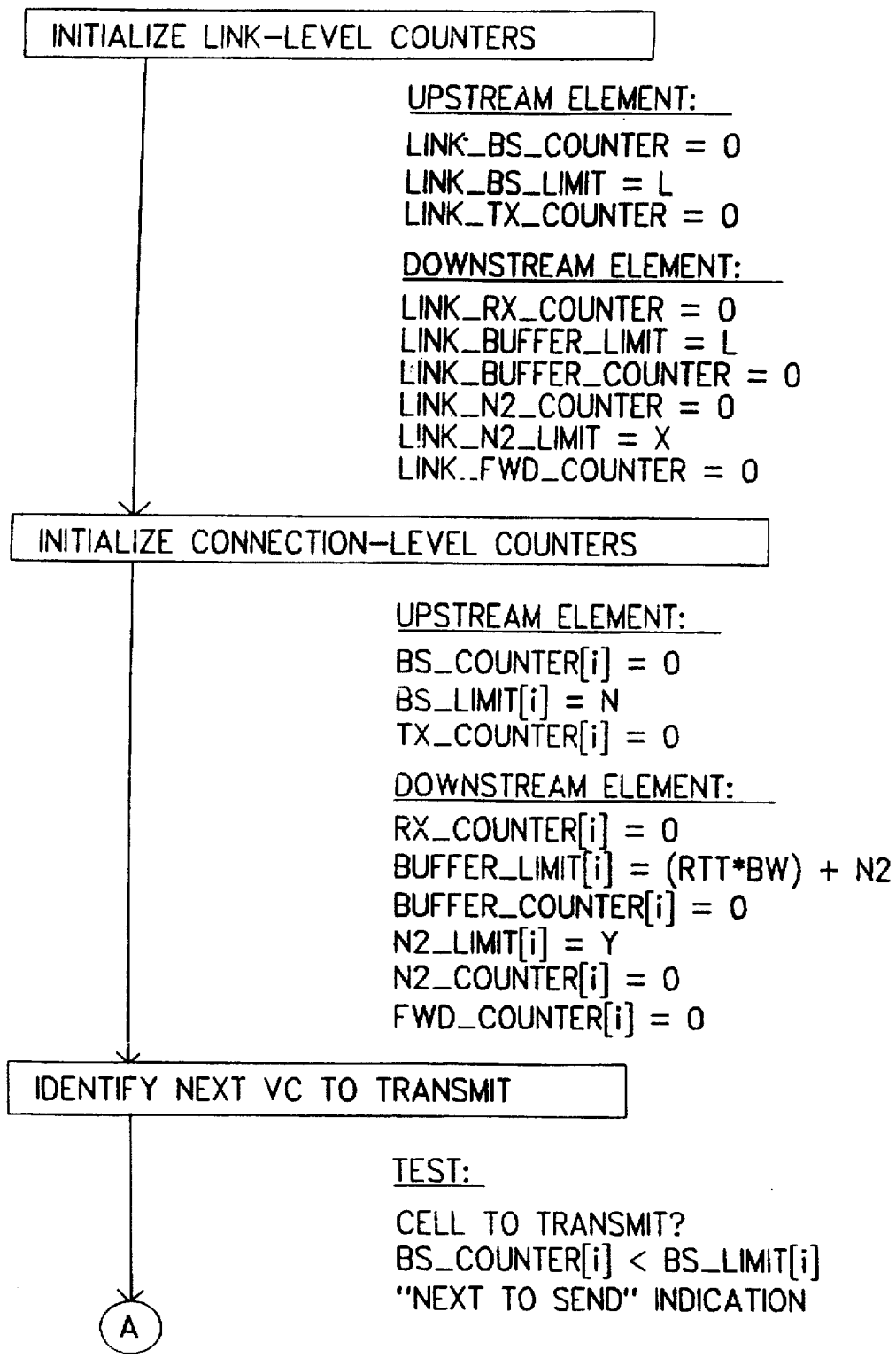
FIGS. 3A and 3B are flow diagram representations of counter initialization and preparation for cell transmission within a flow control method according to the present invention.

Prior to any activity, counters in the upstream and downstream elements 12, 14 are initialized, as illustrated in FIG. 3A. Initialization includes zeroing counters, and providing initial values to limit registers such as Link_BS_Limit and Link_Buffer_Limit. In FIG. 3A, Buffer_Limit[i] is shown being initialized to (RTT*BW), which represents the round-trip time times the virtual connection bandwidth. As for Link_N2_Limit, "X" represents the number of buffers provided in the receiving element 14, and with N2_Limit[i], "Y" represents the number of cell buffers 28 available on a per-virtual connection basis.

In steady state operation, the UP 16 of the transmitter element 12 determines which virtual connection 20 (VC) has a nonzero cell count (i.e. has a cell ready to transmit), a BS_Counter value less than the BS_Limit, and an indication that the VC is next to send (also in FIG. 3A).

Figure 3B:
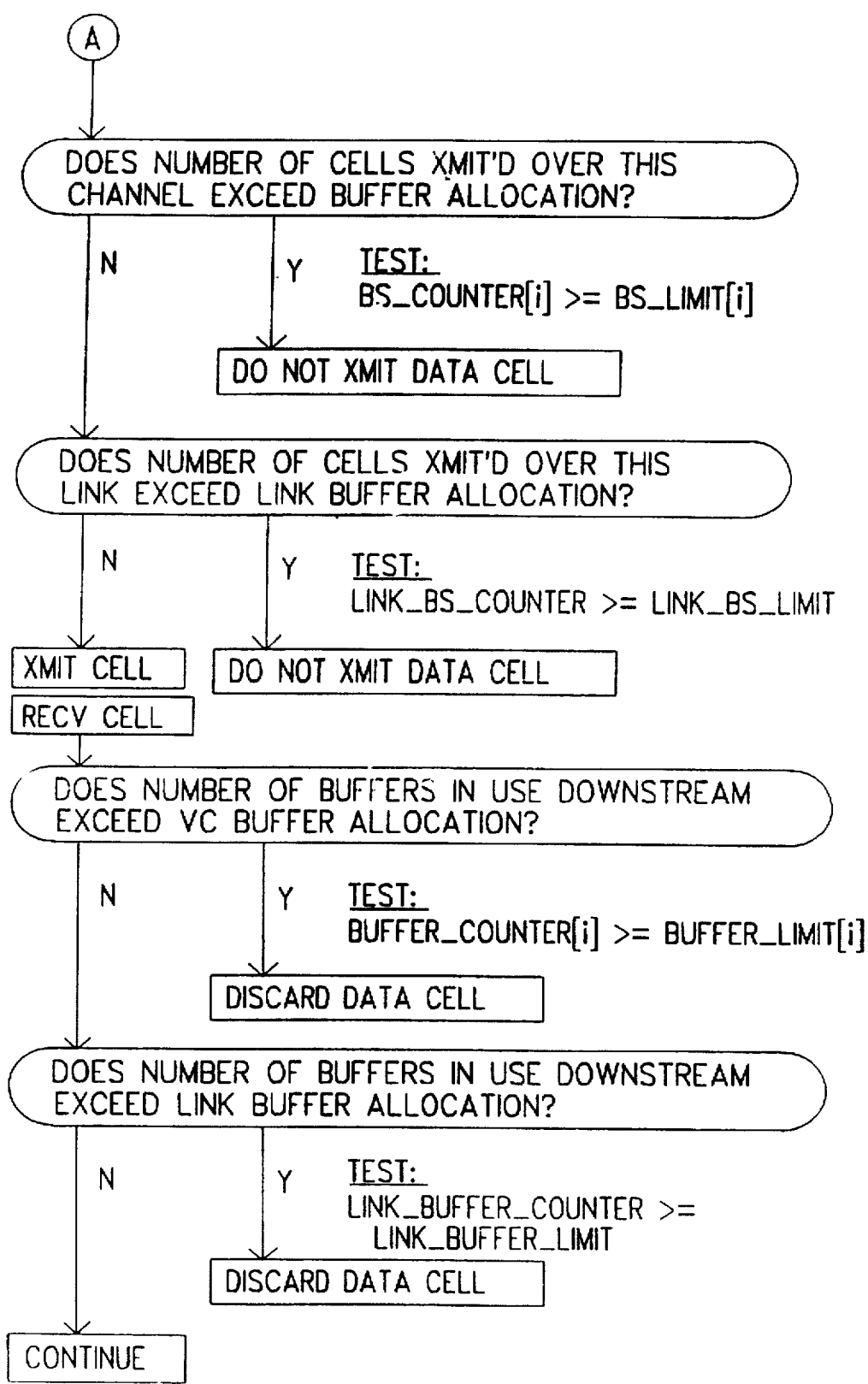
Figure 4:
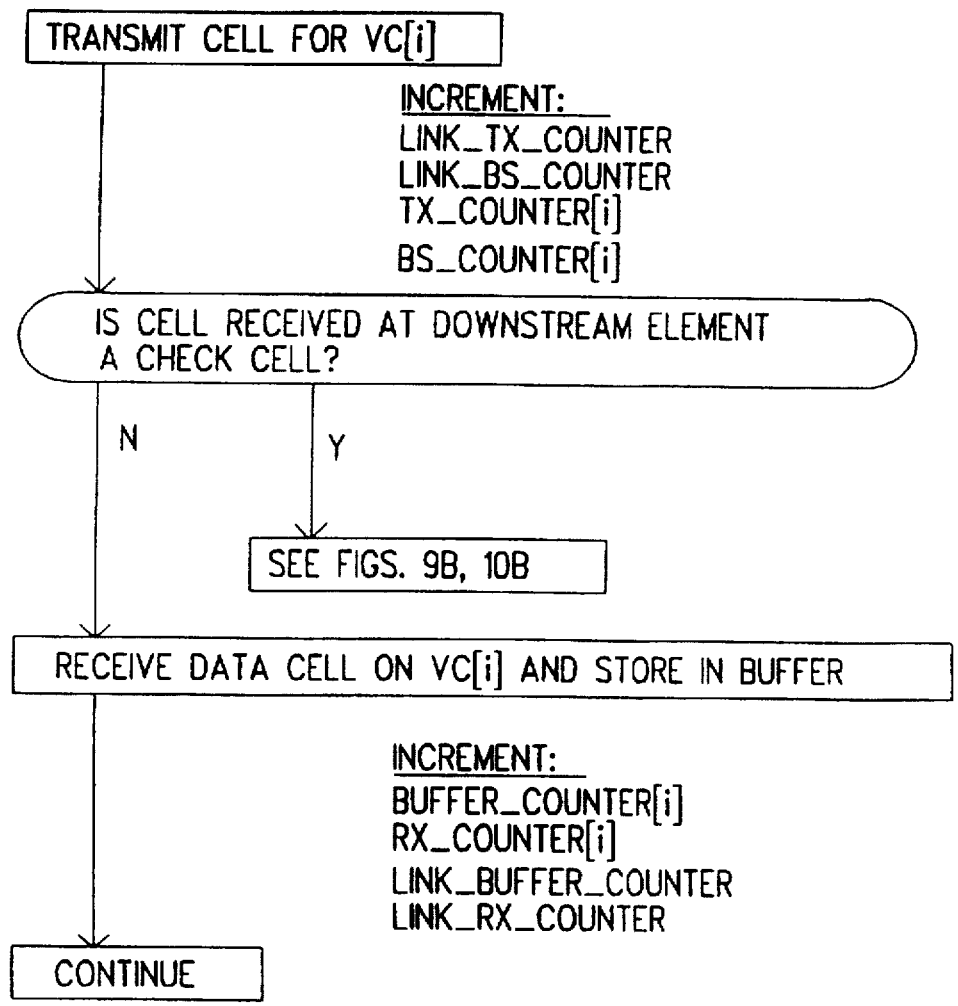
FIG. 4 is a flow diagram representation of cell transmission within the flow control method according to the present invention.

The UP 16 increments BS_Counter 22 and Tx_Counter 26 whenever the UP 16 transmits a data cell over the respective connection 20, assuming flow control is enabled (FIG. 4). Upon receipt of the data cell, the DP 18 checks whether Buffer_Counter 32 equals or exceeds Buffer_Limit 30, which would be an indication that there are no buffers available for receipt of the data cell. If this test fails, the data cell is discarded (FIG. 3B). Otherwise, the DP 18 increments Buffer_Counter 32 and Rx_Counter 40 and the data cell is deposited in a buffer cell 28, as in FIG. 4. The Tx_Counter 26 and the Rx_Counter 40 roll over when they reach their maximum.

If flow control is not enabled, none of the presently described functionality is implemented.

When a data cell is forwarded out of the receiver element 14, Buffer_Counter 32 is decremented. Buffer_Counter 32 should never exceed Buffer_Limit 30 when the connection-level flow control protocol is enabled, with the exception of when BS_Limit 24 has been decreased and the receiver element 14 has yet to forward sufficient cells to bring Buffer_Counter 32 below Buffer_Limit 30. If a data cell is received when Buffer_Counter 32 is greater than or equal to Buffer_Limit 30, the cell is not transmitted (FIG. 3B), and the DP 18 indicates an error condition for that connection 20.

A buffer state update occurs when the receiver element 14 has forwarded a number of data cells equal to N2_Limit 34 out of the receiver element 14. In the first embodiment of the present invention in which the DP 18 maintains Fwd_Counter 38, update involves the transfer of the value of Fwd_Counter 38 from the receiver element 14 back to the transmitter element 12 in an update cell, as in FIG. 6A. In the embodiment of the present invention employing Rx_Counter 40 in the downstream element 14, the value of Rx_Counter 40 minus Buffer_Counter 32 is conveyed in the update cell, as in FIG. 5A. At the transmitter 12, the update cell is used to update the value in BS_Counter 22, as shown for the two embodiments in FIG. 7A. Since BS_Counter 22 is independent of buffer allocation information, buffer allocation can be changed without impacting the performance of this aspect of connectionlevel flow control.

Update cells require an allocated bandwidth to ensure a bounded delay. This delay needs to be accounted for, as a component of round-trip time, to determine the buffer allocation for the respective connection.

The amount of bandwidth allocated to the update cells is a function of a counter, Max_Update_Counter (not illustrated) at the transmitter element 12. This counter forces the scheduling of update and check cells, the latter to be discussed subsequently. There is a corresponding Min Update_Interval counter (not shown) in the transmitter element 12, controlled by the UP 16, which controls the space between update cells. Normal cell packing is seven records per cell, and Min_Update_Interval is similarly set to seven. Since the UP 16 can only process one update record per cell time, back-to-back, fully packed update cells received at the UP 16 would cause some records to be dropped.

Figure 5A:
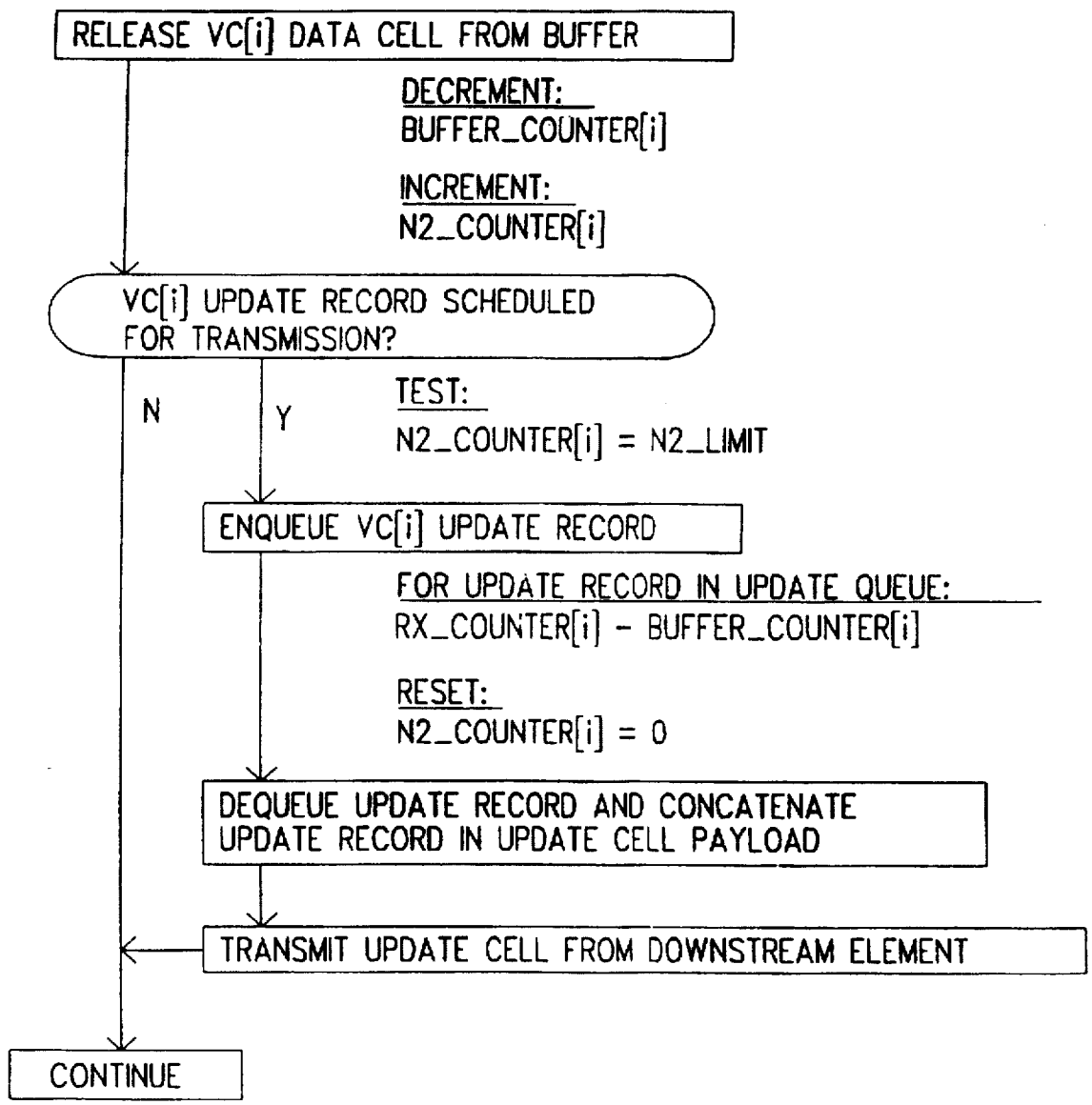
FIGS. 5A and 5B are flow diagram representations of update cell preparation and transmission within the flow control method according to the present invention.
Figure 6A:
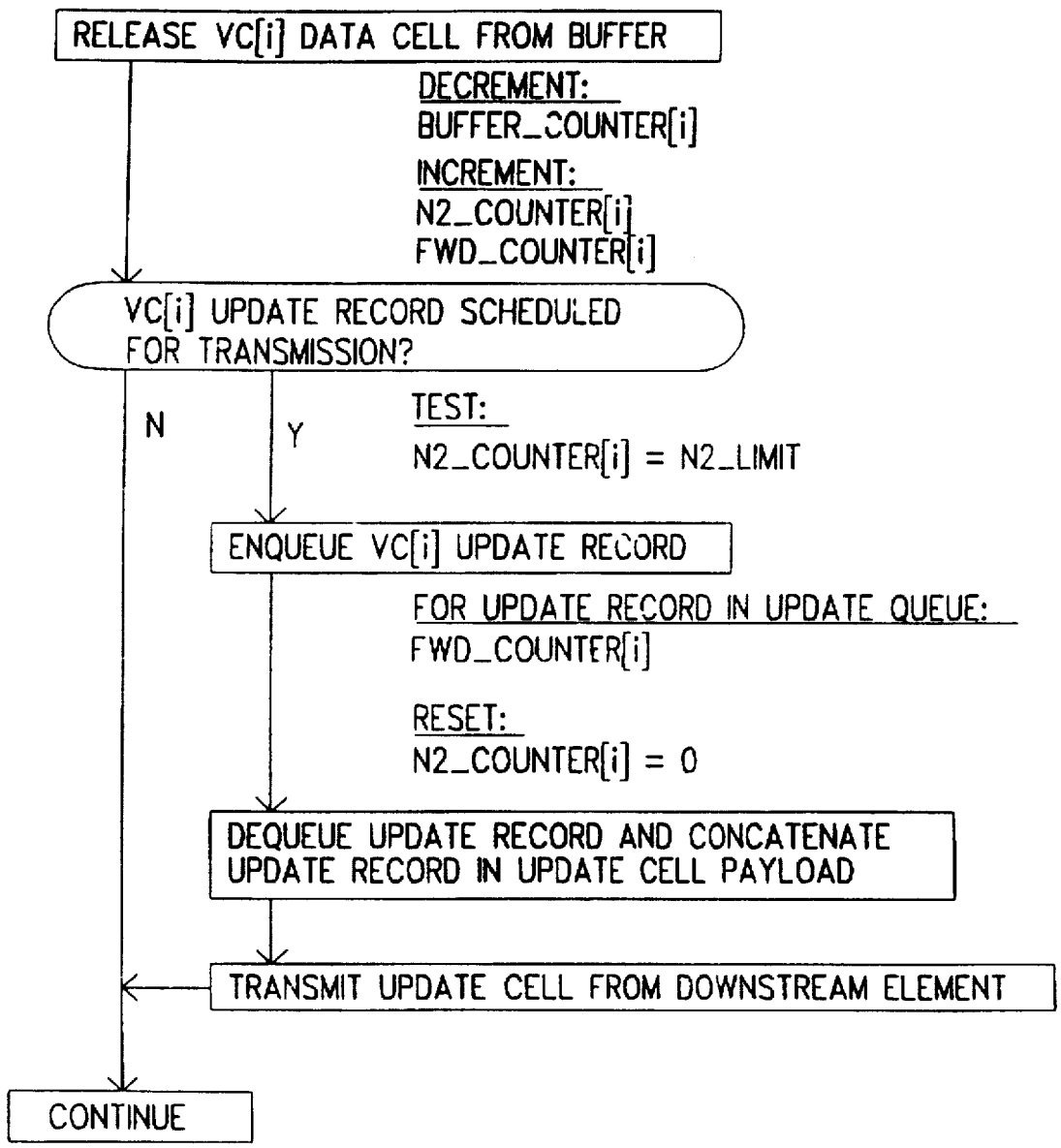
FIGS. 6A and 6B are flow diagram representations of an alternative embodiment of the update cell preparation and transmission of FIGS. 5A and 5B.

An update event occurs as follows, with regard to FIGS. 1, 5A and 6A. When the downstream element 14 forwards (releases) a cell, Buffer_Counter 32 is decremented and N2_Counter 36 and FWD_Counter[i] 38 are incremented. When the N2_Counter 36 is equal to N2_Limit 34, the DP 18 prepares an update cell for transmission back to the upstream element 12 and N2_Counter 36 is set to zero. The upstream element 12 receives a connection indicator from the downstream element 14 forwarded cell to identify which connection 20 is to be updated. In the first embodiment, the DP 18 causes the Fwd_Counter 38 value to be inserted into an update record payload (FIG. 6A). In the second embodiment, the DP 18 causes the Rx_Counter 40 value minus the Buffer_Counter 32 value to be inserted into the update record payload (FIG. 5A). When an update cell is fully packed with records, or as the minimum bandwidth pacing interval is reached, the update cell is transmitted to the upstream element 12, and the N2_Counter 36 is reset to zero.

Figure 7A:
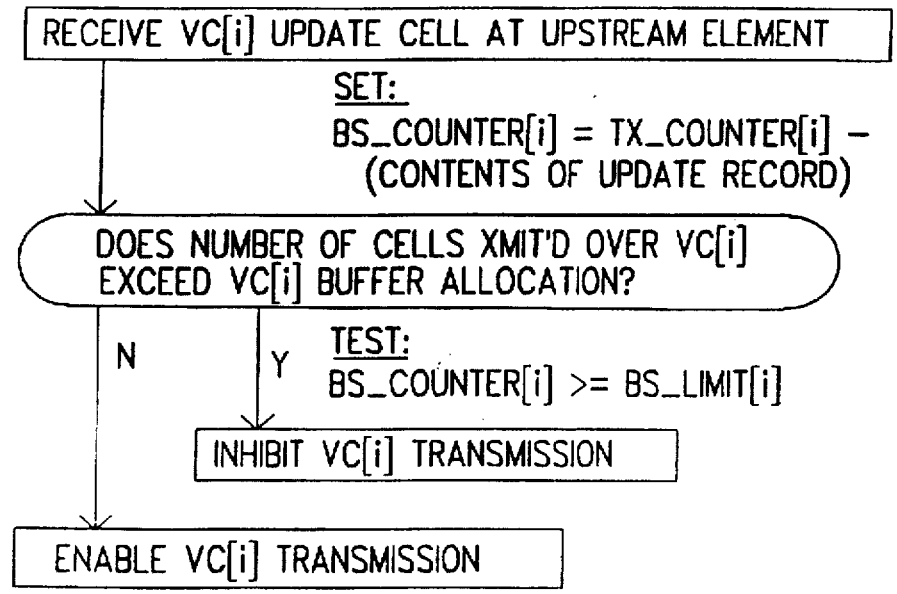
FIGS. 7A and 7B are flow diagram representations of update cell reception within the flow control method according to the present invention.

Once received upstream, the UP 16 receives the connection indicator from the update record to identify the transmitter connection, and extracts the Fwd_Counter 38 value or the Rx_Counter 40 minus Buffer_Counter 32 value from the update record. BS_Counter 22 is reset to the value of Tx_Counter 26 minus the update record value (FIG. 7A). If this connection was disabled from transmitting due to BS_Counter 22 being equal to or greater than BS_Limit 24, this condition should now be reversed, and if so the connection should again be enabled for transmitting.

In summary, the update event provides the transmitting element 12 with an indication of how many cells originally transmitted by it have now been released from buffers within the receiving element 14, and thus provides the transmitting element 12 with a more accurate indication of receiver element 14 buffer 28 availability for that connection 20.

The buffer state check event serves two purposes: 1) it provides a mechanism to calculate and compensate for cell loss or cell insertion due to transmission errors; and 2) it provides a mechanism to start (or restart) a flow if update cells were lost or if enough data cells were lost that N2_Limit 34 is never reached.

One timer (not shown) in the UP subsystem 16 serves all connections. The connections are enabled or disabled on a per connection basis as to whether to send check cells from the upstream transmitter element 12 to the downstream receiver element 14. The check process in the transmitter element 12 involves searching all of the connection descriptors to find one which is check enabled (see FIGS. 8A, 9A). Once a minimum pacing interval has elapsed (the check interval), the check cell is forwarded to the receiver element 14 and the next check enabled connection is identified. The spacing between check cells for the same connection is a function of the number of active flow-controlled connections times the mandated spacing between check cells for all connections. Check cells have priority over update cells.

Figure 8A:
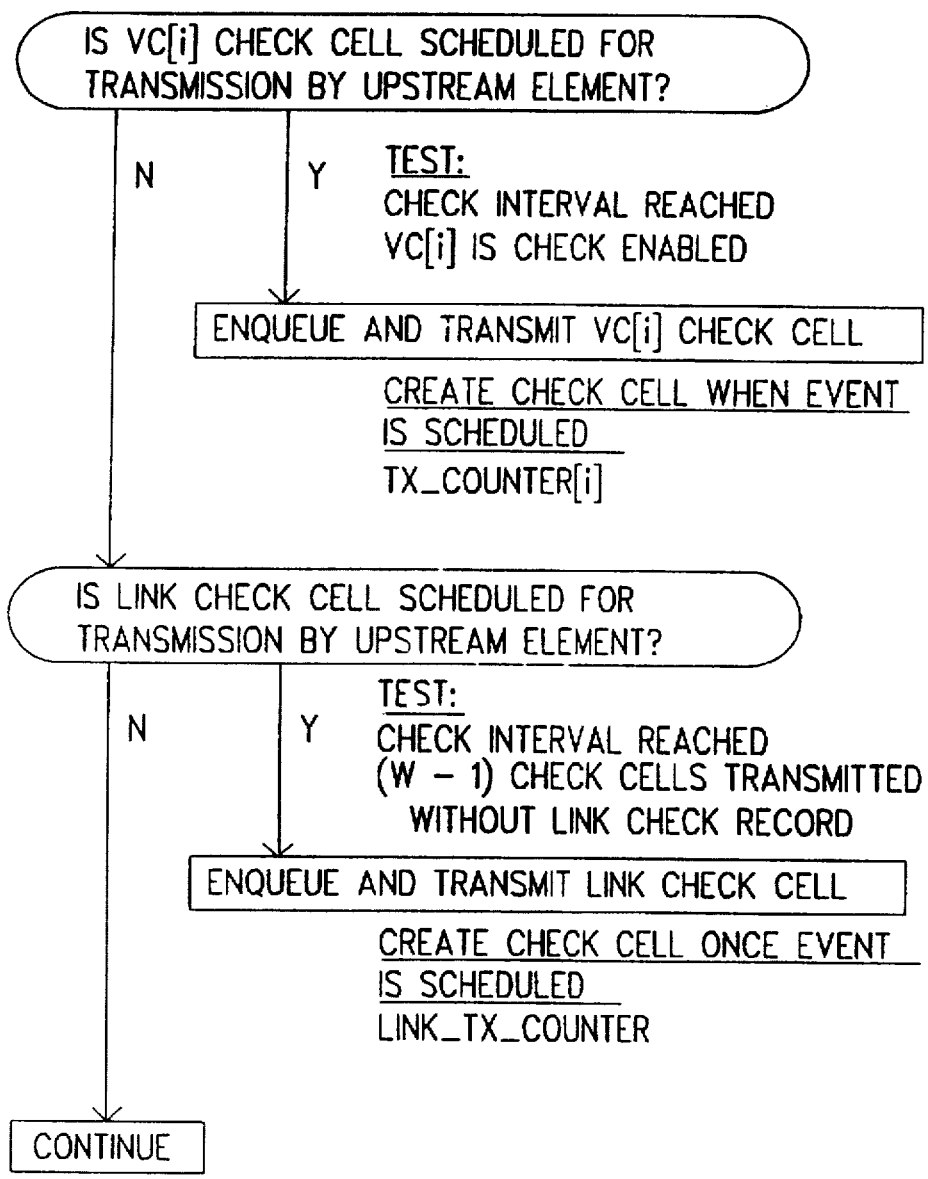
FIGS. 8A, 8B and 8C are flow diagram representations of check cell preparation, transmission and reception within the flow control method according to the present invention.

The check event occurs as follows, with regard to FIGS. 8A through 8C and 9A through 9C. Each transmit element 12 connection 20 is checked after a prescribed number of data cells have been transmitted. If the connection is flow-control enabled and the connection is valid, then a check event is scheduled for transmission to the receiver element 14. A buffer state check cell is generated using the Tx_Counter 26 value for that connection 20 in the check cell payload, and is transmitted using the connection indicator from the respective connection descriptor (FIGS. 8A and 9A).

Figure 9A:
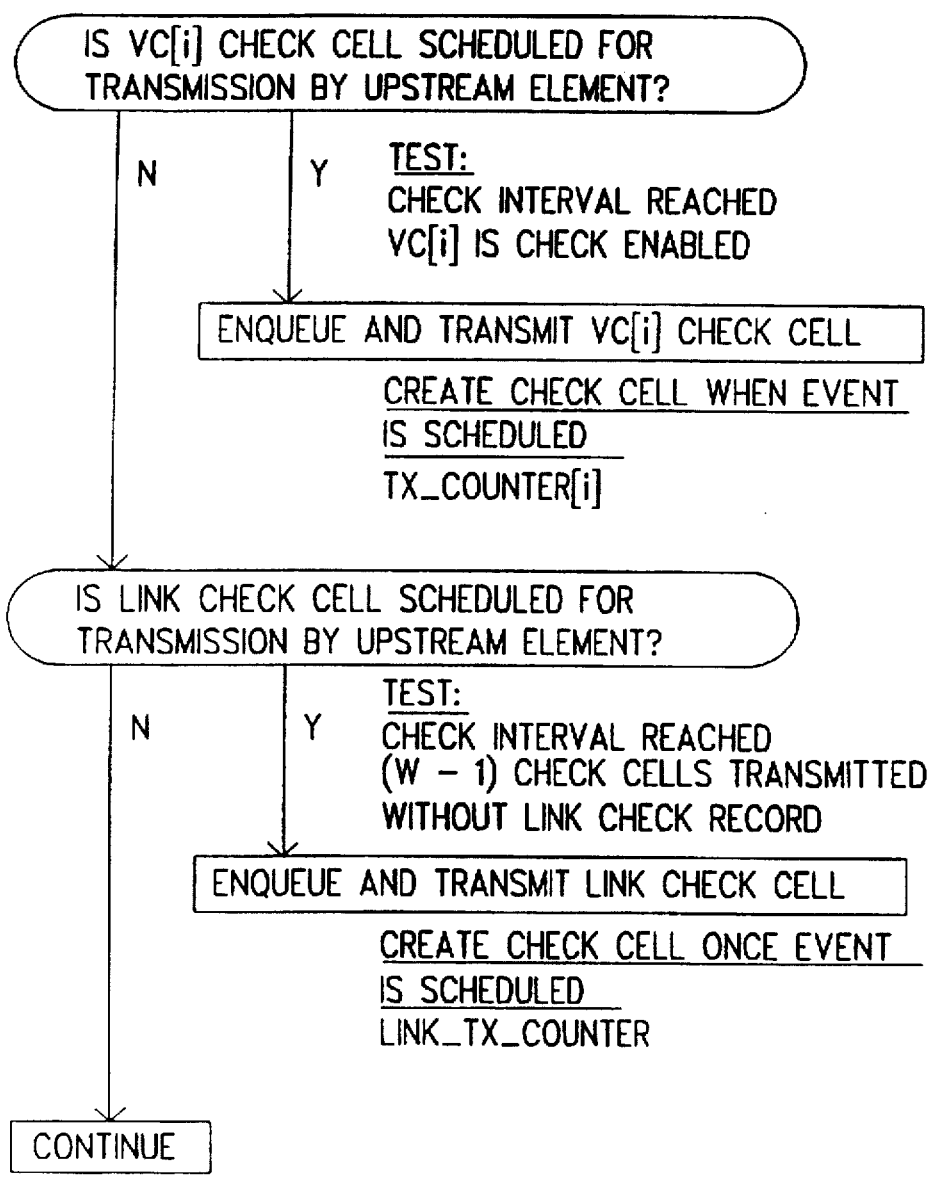
FIGS. 9A, 9B and 9C are flow diagram representations of an alternative embodiment of the check cell preparation, transmission and reception of FIGS. 8A, 8B and 8C.
Figure 9B:
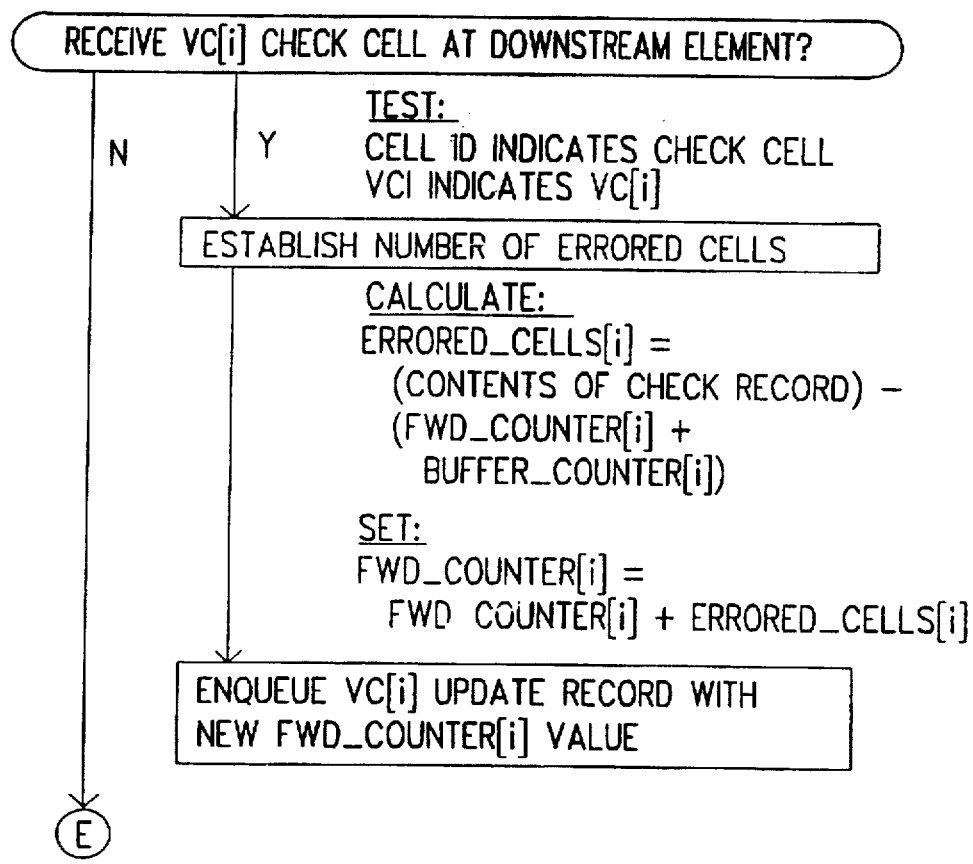

In the first embodiment, a calculation of errored cells is made at the receiver element 14 by summing Fwd_Counter 38 with Buffer_Counter 32, and subtracting this value from the contents of the transmitted check cell record, the value of Tx_Counter 26 (FIG. 9B). The value of Fwd_Counter 38 is increased by the errored cell count. An update record with the new value for Fwd_Counter 38 is then generated. This updated Fwd_Counter 38 value subsequently updates the BS_Counter 22 value in the transmitter element 12.

Figure 8B:
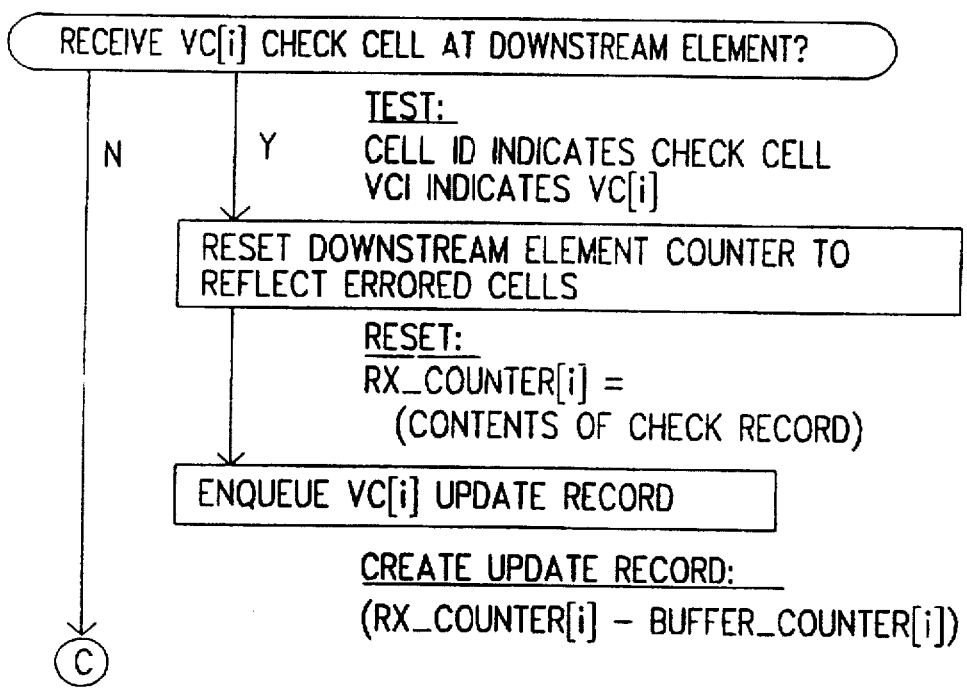

In the second embodiment, illustrated in FIG. 8B, the same is accomplished by resetting the Rx_Counter 40 value equal to the check cell payload value (Tx_Counter 26). A subsequent update record is established using the difference between the values of Rx_Counter 40 and Buffer_Counter 32.

Thus, the check event enables accounting for cells transmitted by the transmitter element 12, through the connection 20, but either dropped or not received by the receiver element 14.

A "no cell loss" guarantee is enabled using buffer state accounting at the connection level since the transmitter element 12 has an up-to-date account of the number of buffers 28 in the receiver element 14 available for receipt of data cells, and has an indication of when data cell transmission should be ceased due to the absence of available buffers 28 downstream.

In order to augment the foregoing protocol with a receiver element buffer sharing mechanism, link-level flow control, also known as link-level buffer state accounting, is added to connection-level flow control. It is possible for such link-level flow control to be implemented without connection-level flow control. However, a combination of the two is preferable since without connection-level flow control there would be no restriction on the number of buffers a single connection might consume.

It is desirable to perform buffer state accounting at the link level, in addition to the connection level, for the following reasons. Link-level flow control enables cell buffer sharing at a receiver element while maintaining the "no cell loss" guarantee afforded by connection-level flow control. Buffer sharing results in the most efficient use of a limited number of buffers. Rather than provide a number of buffers equal to bandwidth times RTT for each connection, a smaller number of buffers is employable in the receiver element 14 since not all connections require a full compliment of buffers at any one time.

A further benefit of link-level buffer state accounting is that each connection is provided with an accurate representation of downstream buffer availability without necessitating increased reverse bandwidth for each connection. A high-frequency link-level update does not significantly effect overall per-connection bandwidth.

Figure 2:
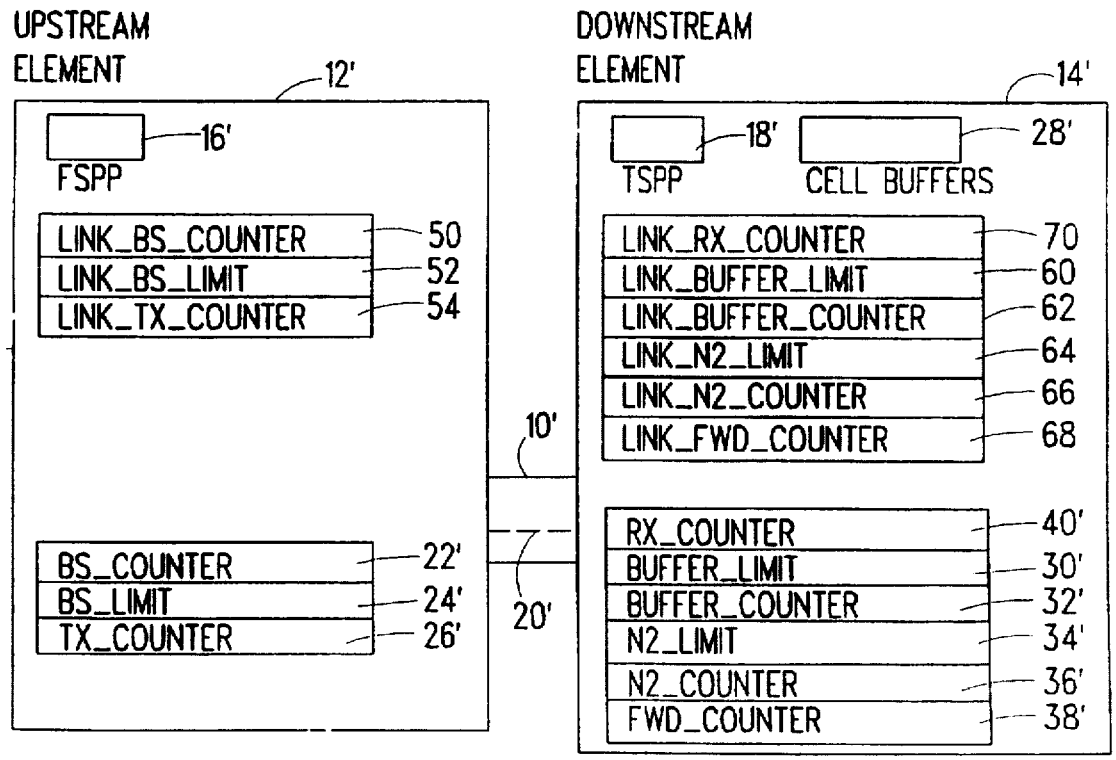
FIG. 2 is a block diagram of a link-level flow control apparatus according to the present invention.

Link-level flow control is described now with regard to FIG. 2. Like elements found in FIG. 1 are given the same reference numbers in FIG. 2, with the addition of a prime. Once again, only one virtual connection 20' is illustrated in the link 10', though the link 10' would normally host multiple virtual connections 20'. Once again, the link 10' is a physical link in a first embodiment, and a logical grouping of plural virtual connections in a second embodiment.

The upstream transmitter element 12' (UP subsystem) partially includes a processor labelled From Switch Port Processor (UP) 16'. The UP processor 16' is provided with two buffer state counters, BS_Counter 22' and BS_Limit 24', and a Tx_Counter 26' each having the same function on a per-connection basis as those described with respect to FIG. 1.

The embodiment of FIG. 2 further includes a set of resources added to the upstream and downstream elements 12', 14' which enable link-level buffer accounting. These resources provide similar functions as those utilized on a per-connection basis, yet they operate on the link level.

For instance, Link_BS_Counter 50 tracks all cells in flight between the UP 16' and elements downstream of the receiver element 14', including cells in transit between the transmitter 12'and the receiver 14' and cells stored within receiver 14' buffers 28'. As with the update event described above with respect to connection-level buffer accounting, Link_BS_Counter 50 is reset during a link update event by subtracting either the Link_Fwd_Counter 68 value or the difference between Link_Rx_Counter 70 and Link_

Buffer_Counter 62 from the Link_TX_Counter 54 value. In a first embodiment, the link-level counters are implemented in external RAM associated with the UP processor 16'.

Link_BS_Limit 52 limits the number of shared downstream cell buffers 28' in the receiver element 14' to be shared among all of the flow-control enabled connections 20'. In a first embodiment, Link_BS_Counter 50 and Link_BS_Limit 52 are both twenty bits wide.

Link_TX_Counter 54 tracks all cells transmitted onto the link 10'. It is used during the link-level update event to calculate a new value for Link_BS_Counter 50. Link_TX Counter 54 is twenty-eight bits wide in the first embodiment.

In the downstream element 14', To Switch Port Processor (DP) 18' also manages a set of counters for each link 10'. Link_Buffer_Limit 60 performs a function in the downstream element 14' similar to Link_BS_Limit 52 in the upstream element 12' by indicating the maximum number of cell buffers 28' in the receiver 14' available for use by all connections 10'. In most cases, Link_BS_Limit 52 is equal to Link_Buffer_Limit 60. The effect of adjusting the number of buffers 28' available up or down on a linkwide basis is the same as that described above with respect to adjusting the number of buffers 28 available for a particular connection 20. Link_Buffer_Limit 60 is twenty bits wide in the first embodiment.

Link_Buffer_Counter 62 provides an indication of the number of buffers in the downstream element 14' which are currently being used by all connections for the storage of data cells. This value is used in a check event to correct the Link_Fwd_Counter 68 (described subsequently). The Link_Buffer_Counter 62 is twenty bits wide in the first embodiment.

Link_N2_Limit 64 and Link_N2_Counter 66, each eight bits wide in the first embodiment, are used to generate link update records, which are intermixed with connection-level update records. Link_N2_Limit 64 establishes a threshold number for triggering the generation of a link-level update record (FIGS. 5B and 6B), and Link_N2_Counter 66 and Link_Fwd_Counter 68 are incremented each time a cell is released out of a buffer cell in the receiver element 14'. In a first embodiment, N2_Limit 34' and Link_N2_Limit 64 are both static once initially configured.

However, in a further embodiment of the present invention, each is dynamically adjustable based upon measured bandwidth. For instance, if forward link bandwidth is relatively high, Link_N2 Limit 64 could be adjusted down to cause more frequent link-level update record transmission. Any forward bandwidth impact would be considered minimal. Lower forward bandwidth would enable the raising of Link_N2 _Limit 64 since the unknown availability of buffers 28' in the downstream element 14' is less critical.

Link_Fwd_Counter 68 tracks all cells released from buffer cells 28' in the receiver element 14' that came from the link 10'in question. It is twenty-eight bits wide in a first embodiment, and is used in the update event to recalculate Link_BS_Counter 50.

Link_Rx_Counter 70 is employed in an alternative embodiment in which Link_Fwd_Counter 68 is not employed. It is also twenty-eight bits wide in an illustrative embodiment and tracks the number of cells received across all connections 20' in the link 10'.

With regard to FIGS. 2 et seq., a receiver element buffer sharing method is described. Normal data transfer by the UP 16'in the upstream element 12' to the DP 18' in the downstream element 14' is enabled across all connections 20' in the link 10'as long as the Link_BS_Counter 50 is less than or equal to Link_BS_Limit 52, as in FIG. 3B. This test prevents the UP 16'from transmitting more data cells than it believes are available in the downstream element 14'. The accuracy of this belief is maintained through the update and check events, described next.

A data cell is received at the downstream element 14' if neither connection-level or link-level buffer limit are exceeded (FIG. 3B). If a limit is exceeded, the cell is discarded.

Figure 5B:
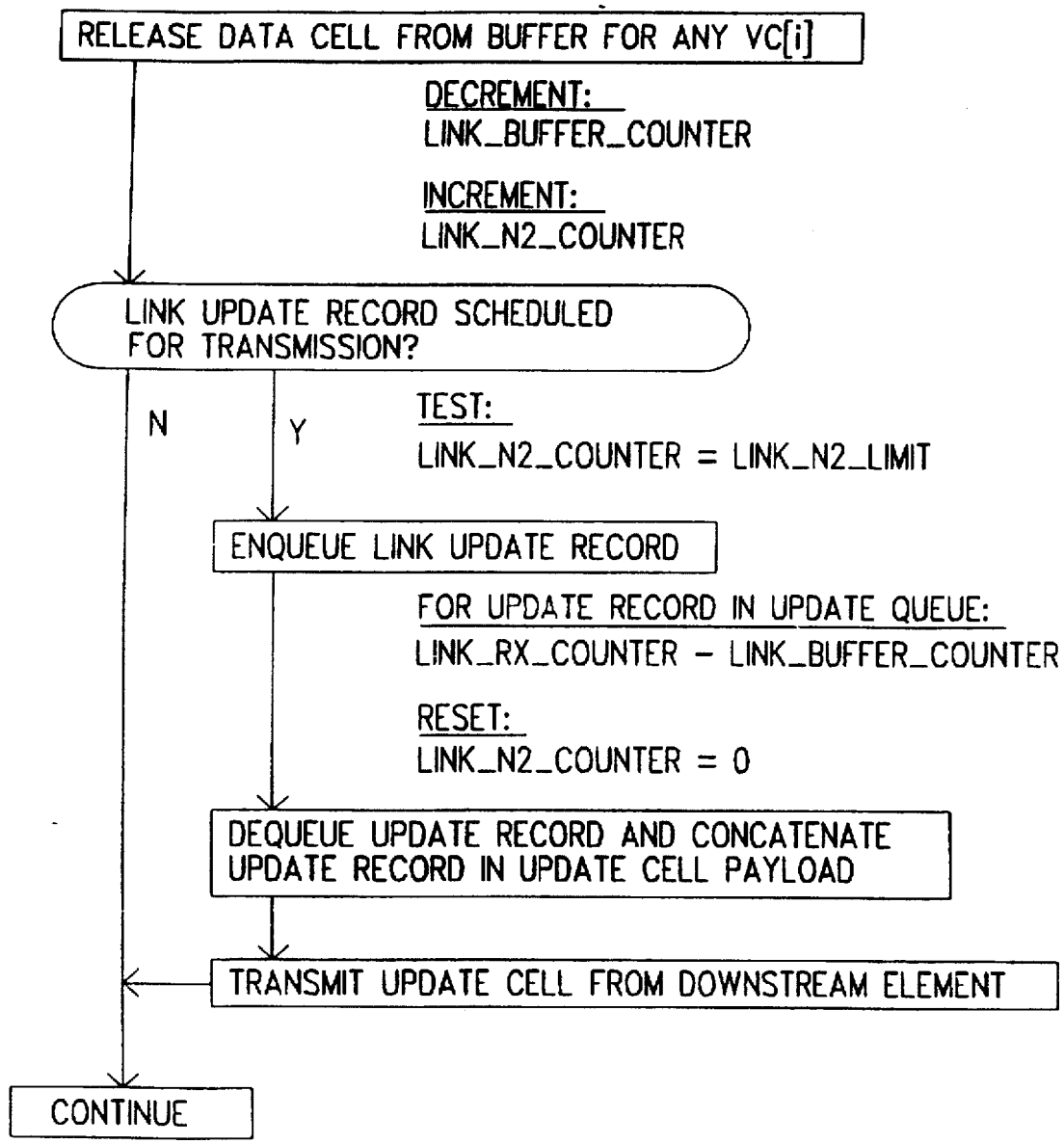
Figure 6B:
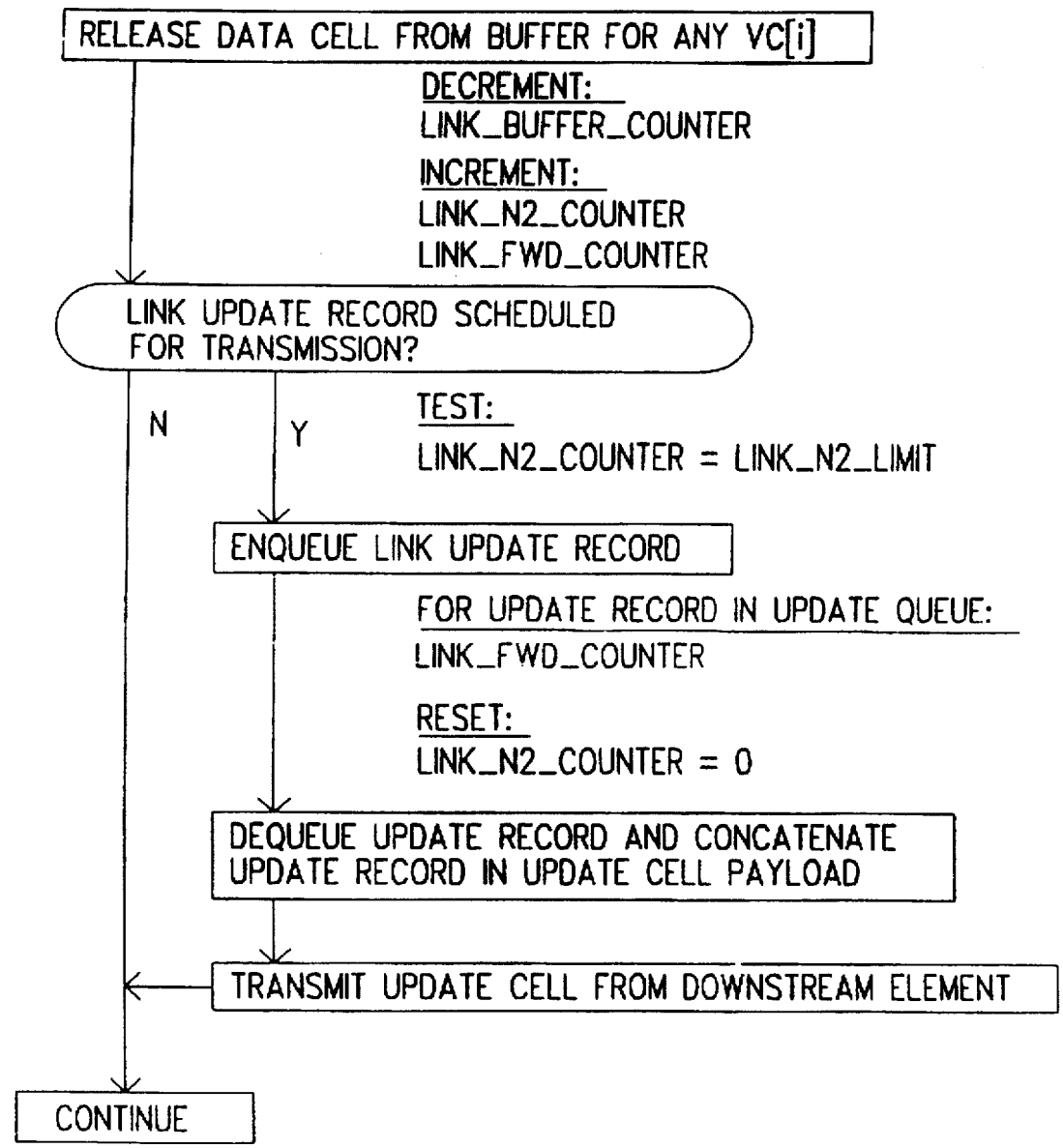

The update event at the link level involves the generation of a link update record when the value in Link_N2_Counter 66 reaches (equals or exceeds) the value in Link_N2_Limit 64, as shown in FIGS. 5B and 6B. In a first embodiment, Link_N2_Limit 64 is set to forty.

Figure 7B:
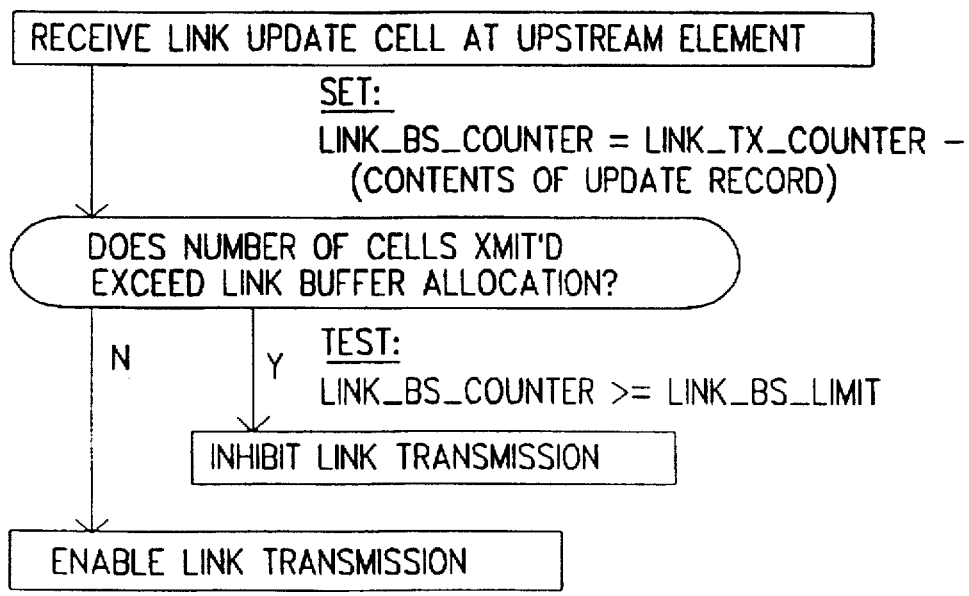

The link update record, the value taken from Link_Fwd_Counter 68 in the embodiment of FIG. 6B, is mixed with the per-connection update records (the value of Fwd_Counter 38') in update cells transferred to the UP 16'. In the embodiment of FIG. 5B, the value of Link_Rx_Counter 70 minus Link_Buffer_Counter 62 is mixed with the per-connection update records. When the upstream element 12' receives the update cell having the link update record, it sets the Link_BS_Counter 50 equal to the value of Link_Tx_Counter 54 minus the value in the update record (FIG. 7B). Thus, Link_BS_Counter 50 in the upstream element 12' is reset to reflect the number of data cells transmitted by the upstream element 12', but not yet released in the downstream element 14'.

The actual implementation of the transfer of an update record, in a first embodiment, recognizes that for each DP subsystem 14', there is an associated UP processor (not illustrated), and for each UP subsystem 12', there is also an associated DP processor (not illustrated). Thus, when an update record is ready to be transmitted by the DP subsystem 14' back to the upstream UP subsystem 12', the DP 18' conveys the update record to the associated UP (not illustrated), which constructs an update cell. The cell is conveyed from the associated UP to the DP (not illustrated) associated with the upstream UP subsystem 12'. The associated DP strips out the update record from the received update cell, and conveys the record to the upstream UP subsystem 12'.

Figure 8C:
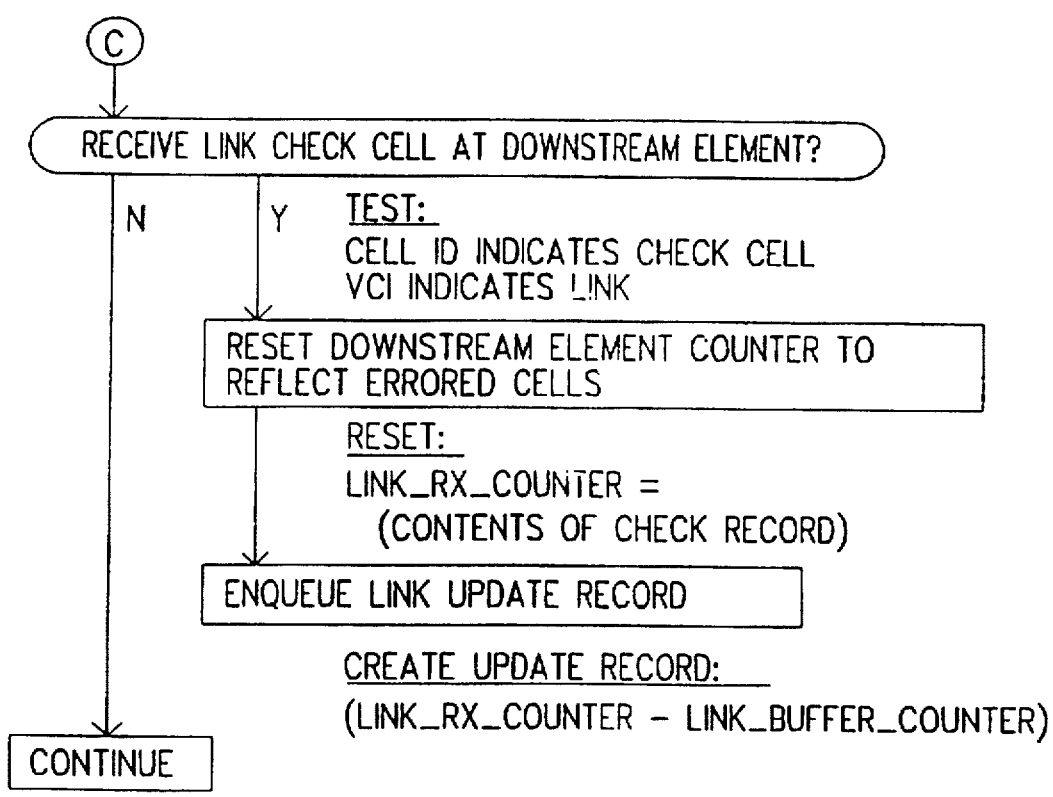
Figure 9C:
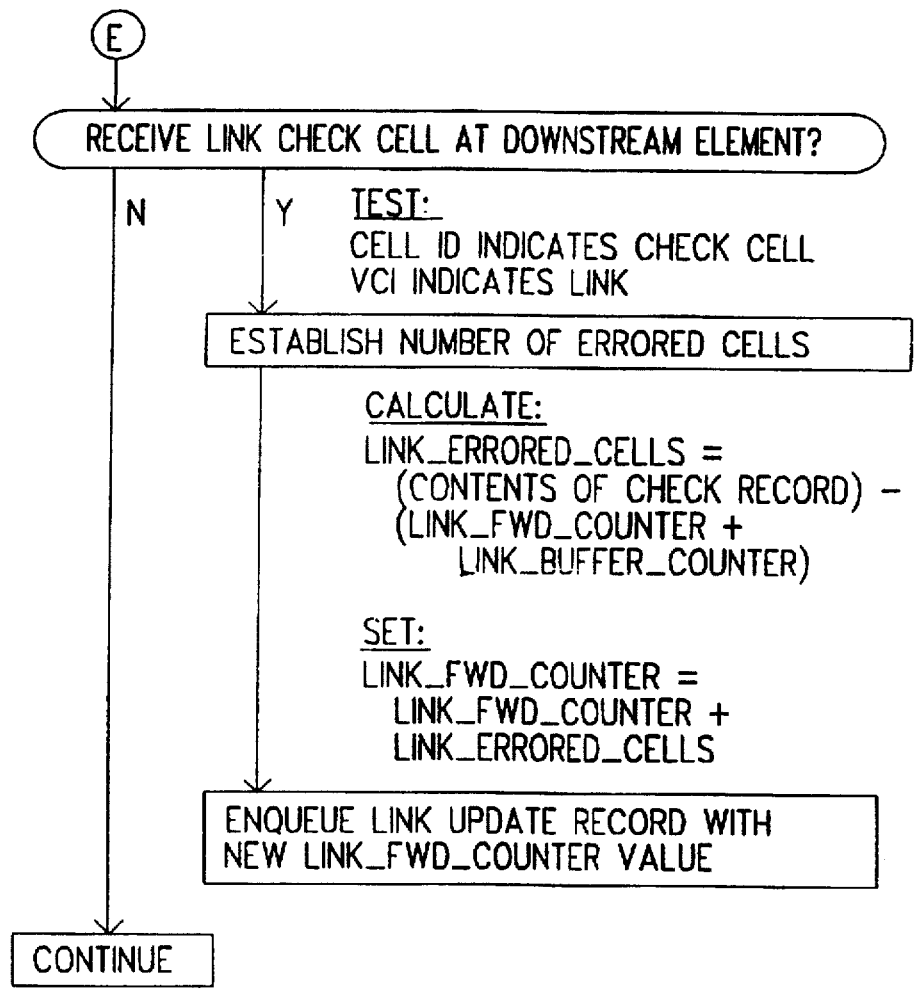

The check event at the link level involves the transmission of a check cell having the Link_Tx_Counter 54 value by the UP 16'every "W" check cells (FIGS. 8A and 9A). In a first embodiment, W is equal to four. At the receiver element 14', the DP 18'performs the previously described check functions at the connection-level, as well as increasing the Link_Fwd_Counter 68 value by an amount equal to the check record contents, Link_Tx_Counter 54, minus the sum of Link_Buffer_Counter 62 plus Link_Fwd_Counter 68 in the embodiment of FIG. 9C. In the embodiment of FIG. 8C, Link_Rx_Counter 70 is reset to the contents of the check record (Link_Tx_Counter 54). This is an accounting for errored cells on a link-wide basis. An update record is then generated having a value taken from the updated Link_Fwd_Counter 68 or Link_Rx_Counter 70 values (FIGS. 8C and 9C).

It is necessary to perform the check event at the link level in addition to the connection level in order to readjust the Link_Fwd_Counter 68 value (FIG. 9C) or Link_Rx_Counter 70 value (FIG. 8C) quickly in the case of large transient link failures.

Again with regard to FIG. 2, the following are exemplary initial values for the illustrated counters in an embodiment having 100 connections in one link.

| | |
|---|---|
| BS_Limit | (24') = 20 |
| Buffer_Limit | (30') = 20 |
| N2_Limit | (34') = 3 |
| Link_BS_Limit | (52) = 1000 |
| Link_Buffer_Limit | (60) = 1000 |
| Link_N2_Counter | (66) = 40 |

The BS_Limit value equals the Buffer_Limit value for both the connections and the link. Though BS_Limit 24' and Buffer_Limit 30'are both equal to twenty, and there are 100 connections in this link, there are only 1000 buffers 28' in the downstream element, as reflected by Link_BS_Limit 52 and Link_Buffer_Limit 60. This is because of the buffer pool sharing enabled by link-level feedback.

The presently described invention can be further augmented with a dynamic buffer allocation scheme, such as previously described with respect to N2_Limit 34 and Link_N2_Limit 64. This scheme includes the ability to dynamically adjust limiting parameters such as BS_Limit 24, Link_BS_Limit 52, Buffer_Limit 30, and Link_Buffer_Limit 60, in addition to N2_Limit 34 and Link_N2_Limit 64. Such adjustment is in response to measured characteristics of the individual connections or the entire link in one embodiment, and is established according to a determined priority scheme in another embodiment. Dynamic buffer allocation thus provides the ability to prioritize one or more connections or links given a limited buffer resource.

On a link-wide basis, as the number of connections within the link increases, it may be desirable to decrease Link_N2_Limit in light of an increased number of connections in the link, since accurate buffer sharing among many connections is desired. Conversely, if the number of connections within the link decreases, Link_N2_Limit may be decreased, since the criticality of sharing limited resources among a relatively small number of connections is decreased.

In addition to adjusting the limits on a per-link basis, it may also be desirable to adjust limits on a per-connection basis in order to change the maximum sustained bandwidth for the connection.

The presently disclosed dynamic allocation schemes are implemented during link operation, based upon previously prescribed performance goals.

In a first embodiment of the present invention, incrementing logic for all counters is disposed within the UP processor 16'. Related thereto, the counters previously described as being reset to zero and counting up to a limit can be implemented in a further embodiment as starting at the limit and counting down to zero. The transmitter and receiver processors interpret the limits as starting points for the respective counters, and decrement upon detection of the appropriate event. For instance, if Buffer_Counter (or Link_Buffer_Counter) is implemented as a decrementing counter, each time a data cell is allocated to a buffer within the receiver, the counter would decrement. When a data cell is released from the respective buffer, the counter would increment. In this manner, the counter reaching zero would serve as an indication that all available buffers have been allocated. Such implementation is less easily employed in a dynamic bandwidth allocation scheme since dynamic adjustment of the limits must be accounted for in the non-zero counts.

Having described preferred embodiments of the invention, it will be apparent to those skilled in the art that other embodiments incorporating the concepts may be used. These and other examples of the invention illustrated above are intended by way of example and the actual scope of the invention is to be determined from the following claims.

What is claimed is:

1. A method of managing a plurality of buffers within a receiving apparatus for storing data cells received over a link from a transmitting apparatus comprising the steps of:

storing, in a first storage location in said receiving apparatus and in a first location in said transmitting apparatus, an indication of the maximum number of buffers available for storing data cells received over said link corresponding to data cells transmitted over said link by said transmitting apparatus over a plurality of connections on said link;

generating, in said transmitting apparatus, a first count indicative of the number of data cells transmitted through said link by said transmitting apparatus for storage in buffers within said receiving apparatus but not released from said buffers;

generating, in said receiving apparatus, a second count indicative of the number of buffers in said receiving apparatus currently storing unreleased data cells received over said link from said transmitting apparatus;

generating, in said receiving apparatus, a third count indicative of the number of data cells released from buffers in said receiving apparatus, said released data cells having been received over said link from said transmitting apparatus;

modifying said first count upon transmission of at least one data cell over said link to reflect an additional data cell requiring a buffer for storage in said receiving apparatus;

modifying said second count upon receipt of a data cell over said link to reflect usage of an additional buffer in said receiving apparatus and upon release of a data cell to reflect availability of an additional buffer in said receiving apparatus; and modifying said third count upon the release of a data cell from a buffer in said receiving apparatus to reflect the availability of an additional buffer for received data cell storage.

2. The method according to claim 1, further comprising the step of:

inhibiting transmitting apparatus transmission of data cells through said plurality of connections in said link to said receiving apparatus when said first count equals or exceeds said stored indication of the maximum number of buffers available.

3. The method according to claim 1, further comprising the step of:

generating, in said transmitting apparatus, a fourth count indicative of a total number of data cells transmitted by said transmitting apparatus over said link; and updating said first count, to reflect cells transmitted by said transmitting apparatus and not released from buffers in said receiving apparatus, by resetting said first count equal to the difference between said third count and said fourth count.

4. The method according to claim 3, further comprising the steps of:

storing, in said receiving apparatus, a threshold value for said third count; and updating said first count when said threshold value is exceeded.

5. The method according to claim 1, wherein said step of generating a third count further comprises:

generating, in said receiving apparatus, a third count indicative of cells from a first subset of said plurality of connections in said link released from buffers in said receiving apparatus.

6. The method according to claim 1, further comprising the steps of:

generating, in said receiver apparatus, a fourth count indicative of a number of errored cells by providing said receiver apparatus with said first count value, said fourth count having the value of said third count and said second count subtracted from said first count; and correcting said third count by adding said fourth count to said third count.

7. The method according to claim 1, wherein said indication of the maximum number of buffers available for storing is dynamically adjustable.

8. A method of sharing a finite number of buffers within a receiver, said receiver connected to a transmitter via a link providing a plurality of flow controlled virtual connections, said method comprising the steps of:

storing, in a first storage location in said transmitter, a maximum number of buffers available to said link;

generating a first count in said transmitter indicative of all data cells transmitted through said connections of said link by said transmitter to said receiver;

generating a second count in said transmitter indicative of data cells currently being transmitted through said connections of said link by said transmitter to said receiver, and of data cells not known to be released from a subset of said buffers in said receiver;

generating a third count in said receiver indicative of the total number of buffers in said receiver presently storing data cells;

generating a fourth count in said receiver indicative of all data cells released from buffers in said receiver, said released data cells originally received from said transmitter via said link;

storing, in a second storage location within said receiver, a maximum number of data cells to be released from buffers in said receiver during a first interval; and storing, in a third storage location within said receiver, a number of data cells actually released from buffers in said receiver during said first interval.

9. The method according to claim 8, wherein said step of generating said first count further comprises modifying said first count upon transmission of a data cell through one of said connections.

10. The method according to claim 8, wherein said step of generating said second count further comprises modifying said second count upon transmission of a data cell through one of said connections of said link.

11. The method according to claim 8, wherein said step of generating said third count further comprises modifying said third count upon storage of an additional data cell in a buffer in said receiver.

12. The method according to claim 8, wherein said step of generating said fourth count further comprises modifying said fourth count upon release of an additional data cell from a buffer in said receiver.

13. The method according to claim 8, further comprising the step of inhibiting said transmitter from transmitting data cells through said connections of said link when said second count equals or exceeds said maximum number of buffers.

14. The method according to claim 8, further comprising the step of updating said second count by adjusting said second count to be equal to said first count minus said fourth count.

15. The method according to claim 14, wherein said updating step occurs when said count of data cells released during said first interval equals or exceeds said maximum number of data cells to be released.

16. The method according to claim 8, further comprising the steps of:

generating a count of errored cells by subtracting said fourth count and said third count from said first count; and generating a corrected second count by resetting said second count to the sum of said errored cell count and said second count.

17. The method of according to claim 8, wherein said maximum number of buffers available and said maximum number of data cells to be released are each dynamically adjustable.

18. A method of managing a plurality of buffers within a receiving apparatus for storing data cells received over a link from a transmitting apparatus comprising the steps of:

storing, in a first storage location in said receiving apparatus and in a first location in said transmitting apparatus, an indication of the maximum number of buffers available for storing data cells received over said link corresponding to data cells transmitted over said link by said transmitting apparatus over a plurality of connections on said link;

generating, in said transmitting apparatus, a first count indicative of the number of data cells transmitted through said link by said transmitting apparatus for storage in buffers within said receiving apparatus but not released from said buffers;

generating, in said receiving apparatus, a second count indicative of the number of buffers in said receiving apparatus currently storing unreleased data cells received over said link from said transmitting apparatus;

generating, in said receiving apparatus, a third count indicative of the total number of data cells received over said link from said transmitting apparatus;

modifying said first count upon transmission of a data cell over said link to reflect an additional data cell requiring a buffer for storage in said receiving apparatus;

modifying said second count upon receipt of a data cell over said link to reflect usage of an additional buffer in said receiving apparatus and upon release of a data cell to reflect availability of an additional buffer in said receiving apparatus; and modifying said third count upon the receipt of a data cell in said receiving apparatus to reflect an additional data cell transmitted from said transmitting apparatus and received at said receiving apparatus.

19. The method according to claim 18, further comprising the step of:

inhibiting transmitting apparatus transmission of data cells through said plurality of connections in said link to said receiving apparatus when said first count equals or exceeds said stored indication of the maximum number of buffers available.

20. The method according to claim 18, further comprising the steps of:

generating, in said transmitting apparatus, a fourth count indicative of a total number of data cells transmitted by said transmitting apparatus over said link; and updating said first count, to reflect cells transmitted by said transmitting apparatus and not released from buffers in said receiving apparatus, by resetting said first count equal to the fourth count minus the difference between said second count and said third count.

21. The method according to claim 18, wherein said step of generating said third count further comprises:

generating, in said receiving apparatus, a third count indicative of cells from a first subset of said plurality of connections in said link released from buffers in said receiving apparatus.

22. The method according to claim 18, further comprising the steps of:

generating, in said transmitting apparatus, a fourth count indicative of a total number of data cells transmitted by said transmitting apparatus over said link; and correcting said third count by resetting said third count equal to said fourth count.

23. The method according to claim 18, wherein said maximum number of buffers available for storing data cells is dynamically adjustable.

24. The method according to claim 18, wherein said steps of generating said first and second counts further comprise initializing each of said first and second counts at a respective maximum, and wherein said steps of modifying said first and second counts further comprises decrementing said first count upon said transmission of said data cell, and decrementing said second count upon said receipt of said data cell.

25. A method of sharing a finite number of buffers within a receiver, said receiver connected to a transmitter via a link providing a plurality of flow controlled virtual connections, said method comprising the steps of:

storing, in a first storage location in said transmitter, a maximum number of buffers available to said link;

generating a first count in said transmitter indicative of all data cells transmitted through said connections of said link by said transmitter to said receiver;

generating a second count in said transmitter indicative of data cells currently being transmitted through said connections of said link by said transmitter to said receiver, and of data cells not known to be released from a subset of said buffers in said receiver;

generating a third count in said receiver indicative of the total number of buffers in said receiver presently storing data cells;

generating a fourth count in said receiver indicative of all data cells received in said receiver from said transmitter via said link;

storing, in a second storage location within said receiver, a maximum number of data cells to be released from buffers in said receiver during a first interval; and storing, in a third storage location within said receiver, a number of data cells actually released from buffers in said receiver during said first interval.

26. The method according to claim 25, wherein said step of generating said first count further comprises modifying said first count upon transmission of a data cell through one of said connections.

27. The method according to claim 25, wherein said step of generating said second count further comprises modifying said second count upon transmission of a data cell through one of said connections of said link.

28. The method according to claim 27, wherein said step of modifying further comprises decrementing said second count upon transmission of said data cell.

29. The method according to claim 25, wherein said step of generating said third count further comprises modifying said third count upon storage of an additional data cell in a buffer in said receiver.

30. The method according to claim 29, wherein said step of modifying said third count further comprises decrementing said third count upon storage of said additional data cell.

31. The method according to claim 25, wherein said step of generating said fourth count further comprises modifying said fourth count upon receipt of an additional data cell in said receiver.

32. The method according to claim 25, further comprising the step of inhibiting said transmitter from transmitting data cells through said connections of said link when said second count equals or exceeds said maximum number of buffers.

33. The method according to claim 25, further comprising the step of updating said second count by resetting said second count equal to said first count minus the difference between said fourth count and said third count.

34. The method according to claim 33, wherein said updating step occurs when said count of data cells released during said first interval equals or exceeds said maximum number of data cells to be released.

35. The method according to claim 25, further comprising the steps of:

accounting for errored cells by resetting said fourth count equal to said first count.

36. The method according to claim 25, wherein said maximum number of buffers available to said link and said maximum number of data cells to be released are each dynamically adjustable.

37. A method of sharing a finite number of buffers within a receiver, said receiver connected to a transmitter via a link providing a plurality of flow controlled virtual connections, said method comprising the steps of:

dynamically adjusting, in a first storage location in said transmitter, a maximum number of buffers available to said link;

generating a first count in said transmitter indicative of all data cells not transmitted through said connections of said link by said transmitter to said receiver;

generating a second count in said transmitter indicative of data cells currently being transmitted through said connections of said link by said transmitter to said receiver, and of data cells not known to be released from a subset of said buffers in said receiver;

generating a third count in said receiver indicative of the total number of buffers in said receiver presently storing data cells;

generating a fourth count in said receiver indicative of all data cells released from buffers in said receiver, said released data cells originally received from said transmitter via said link;

dynamically adjusting, in a second storage location within said receiver, a maximum number of data cells to be released from buffers in said receiver during a first interval; and storing, in a third storage location within said receiver, a number of data cells actually released from buffers in said receiver during said first interval.

38. The method according to claim 37, wherein said maximum number of buffers available and said maximum number of data cells to be released are dynamically adjusted based upon current buffer demands in said receiver.

39. The method according to claim 37, wherein said maximum number of buffers available and said maximum number of data cells to be released are dynamically adjusted based upon pre-defined connection-level prioritization.

40. The method according to claim 37, wherein said maximum number of buffers available and said maximum number of data cells to be released are dynamically adjusted based upon pre-defined link-level prioritization.

41. A method of sharing a finite number of buffers within a receiver, said receiver connected to a transmitter via a link providing a plurality of flow controlled virtual connections, said method comprising the steps of:

dynamically adjusting, in a first storage location in said transmitter, a maximum number of buffers available to said link;

generating a first count in said transmitter indicative of all data cells transmitted through said connections of said link by said transmitter to said receiver;

generating a second count in said transmitter indicative of data cells currently being transmitted through said connections of said link by said transmitter to said receiver, and of data cells not known to be released from a subset of said buffers in said receiver;

generating a third count in said receiver indicative of the total number of buffers in said receiver presently storing data cells;

generating a fourth count in said receiver indicative of all data cells received in said receiver from said transmitter via said link;

dynamically adjusting, in a second storage location within said receiver, a maximum number of data cells to be released from buffers in said receiver during a first interval; and storing, in a third storage location within said receiver, a number of data cells actually released from buffers in said receiver during said first interval.

42. The method according to claim 41, wherein said maximum number of buffers available and said maximum number of data cells to be released are dynamically adjusted based upon current buffer demands in said receiver.

43. The method according to claim 41, wherein said maximum number of buffers available and said maximum number of data cells to be released are dynamically adjusted based upon pre-defined connection-level prioritization.

44. The method according to claim 41, wherein said maximum number of buffers available and said maximum number of data cells to be released are dynamically adjusted based upon pre-defined link-level prioritization.

45. A link-level buffer sharing apparatus, comprising:

a communications link for supporting a plurality of connections thereon and having a transmitter end and a receiver end;

a transmitter at said transmitter end of said link for transmitting data cells over said link; and a receiver at said receiver end of said link, said receiver having a plurality of buffers for storing data cells received from said transmitter via said link for said connections, said plurality of buffers comprising collectively a buffer pool, wherein said receiver provides total buffer occupancy status information at the link level to said transmitter as data cells are received from said transmitter.

46. The apparatus according to claim 45, said communications link further comprising a plurality of virtual connections through which said data cells are transmitted from said transmitter to said receiver.

47. The apparatus according to claim 45, said transmitter further comprising:

a first counter for counting a number of data cells transmitted by said transmitter over said link to said receiver, said first counter incrementing upon transmission of each data cell; and operating logic operative to increment said first counter.

48. The apparatus according to claim 45, said receiver further comprising:

a second counter for counting a number of data cells currently stored in said plurality of buffers, said second counter incrementing upon storage of each data cell in a respective buffer and decrementing upon release of each data cell from a respective buffer and operating logic operative to increment and decrement said second counter.

49. The apparatus according to claim 48, said receiver further comprising:

a third counter for counting a number of data cells released from said plurality of buffers, said third counter incrementing upon release of each data cell from said respective buffer; and operating logic operative to increment said third counter, wherein said status information comprises a value of said third counter.

50. The apparatus according to claim 48, said receiver further comprising:

a fourth counter for counting a number of data cells received by said receiver from said transmitter over said link, said fourth counter incrementing upon receipt of each data cell from said transmitter; and operating logic operative to increment said fourth counter, wherein said status information comprises a value of said fourth counter.

51. A link buffer sharing apparatus for use with a plurality of buffers within a receiver, said receiver connected to a transmitter via at least two virtual connections in a link and receiving in said buffers a plurality of data cells from said transmitter, said apparatus comprising:

a transmitter buffer counter associated with said transmitter for counting data cells currently in transmission over said link from said transmitter to said receiver and data cells stored within a subset of said buffers in said receiver;

a buffer limit register associated with said transmitter for indicating a maximum number of buffers in said receiver for storage of data cells from said transmitter via said link;

a transmitted cell counter associated with said transmitter for counting all data cells transmitted by said transmitter to said receiver over the link;

a receiver buffer counter associated with said receiver for counting a number of buffers in said receiver storing data cells received from said transmitter via said link;

a released cell counter associated with said receiver for counting all data cells released from buffers in said receiver; and operating logic operative to increment said transmitter buffer counter, said transmitted cell counter, said receiver buffer counter, and said released cell counter, operative to decrement said receiver buffer counter, and operative to adjust said transmitter buffer counter, wherein said transmitter buffer counter is incremented upon transmission of a data cell from said transmitter to said receiver via said link, wherein said transmitted cell counter is incremented upon transmission of a data cell from said transmitter to said receiver via said link, wherein said receiver buffer counter is incremented upon receipt of a data cell at said receiver from said transmitter via said link and is decremented upon release of a data cell from a respective buffer, and wherein said released cell counter is incremented upon release from said receiver of a data cell originally received from said transmitter via said link.

52. The method according to claim 51, wherein said maximum number of buffers in said receiver for storage of data cells is dynamically adjustable.

53. The apparatus according to claim 51, wherein said link further comprises a physical link.

54. The apparatus according to claim 51, wherein said link further comprises a virtual link.

55. The apparatus according to claim 51, said operating logic comprising:

a transmitter processor associated with said transmitter for updating said transmitter buffer counter, said buffer limit register, and said transmitted cell counter; and a receiver processor associated with said receiver for updating said receiver buffer counter and said released cell counter.

56. The apparatus according to claim 55, further comprising:

an update release counter associated with said receiver and updated by said receiver processor, said update release counter for counting data cells released from buffers in said receiver during a specified interval; and a release limit register associated with said receiver and said receiver processor providing an indication of a maximum number of data cells to be released from buffers in said receiver during said specified interval.

57. The apparatus according to claim 56, wherein said maximum number of data cells to be released is dynamically adjustable.

58. The apparatus according to claim 56, wherein said receiver processor causes the transmission of the value of said transmitted cell counter minus said released cell counter to said transmitter when the value of said update release counter is equal to said release limit register, and wherein said transmitter processor receives said released cell counter value and loads said value into said transmitter buffer counter.

59. The apparatus according to claim 55, wherein said transmitter processor enables transmission of data cells in said virtual connections of said link in a first mode, and inhibits data cell transmission over all connections of said link in a second mode.

60. The apparatus according to claim 59, wherein said first mode is defined by said transmitter buffer counter being less than said buffer limit register, and said second mode is defined by said transmitter buffer counter being equal to or greater than said buffer limit register.

61. The apparatus according to claim 55, wherein said transmitter processor transmits a value of said transmitted cell counter to said receiver processor at a specified interval, and said receiver processor subtracts a value of said receiver buffer counter and a value of said released cell counter from said transmitted cell counter value to establish an errored cell count, said receiver processor incrementing said released cell counter by an amount equal to said errored cell count.

62. A link buffer sharing apparatus for use with a plurality of buffers within a receiver, said receiver connected to a transmitter via at least two virtual connections in a link and receiving in said buffers a plurality of data cells from said transmitter, said apparatus comprising:

a transmitter buffer counter associated with said transmitter for counting data cells currently in transmission over said link from said transmitter to said receiver and data cells stored within a subset of said buffers in said receiver;

a buffer limit register associated with said transmitter for indicating a maximum number of buffers in said receiver for storage of data cells from said transmitter via said link;

a transmitted cell counter associated with said transmitter for counting all data cells transmitted by said transmitter to said receiver over the link;

a receiver buffer counter associated with said receiver for counting a number of buffers in said receiver storing data cells received from said transmitter via said link;

a received cell counter associated with said receiver for counting all data cells received from said transmitter via said link; and operating logic operative to increment said transmitter buffer counter, said transmitted cell counter, said receiver buffer counter, and said released cell counter, operative to decrement said receiver buffer counter, and operative to adjust said transmitter buffer counter, wherein said transmitter buffer counter is incremented upon transmission of a data cell from said transmitter to said receiver via said link, wherein said transmitted cell counter is incremented upon transmission of a data cell from said transmitter to said receiver via said link, wherein said receiver buffer counter is incremented upon receipt of a data cell at said receiver from said transmitter via said link and is decremented upon release of a data cell from a respective buffer, and wherein said received cell counter is incremented upon receipt of a data cell at said receiver from said transmitter via said link.

63. The apparatus according to claim 62, wherein said maximum number of buffers in said receiver for storage of data cells is dynamically adjustable.

64. The apparatus according to claim 62, wherein said link further comprises a physical link.

65. The apparatus according to claim 62, wherein said link further comprises a virtual link.

66. The apparatus according to claim 62, said operating logic comprising:

a transmitter processor associated with said transmitter for updating said transmitter buffer counter, said buffer limit register, and said transmitted cell counter; and a receiver processor associated with said receiver for updating said receiver buffer counter and said received cell counter.

67. The apparatus according to claim 66, further comprising:

an update release counter associated with said receiver and updated by said receiver processor, said update release counter for counting data cells released from buffers in said receiver during a specified interval; and a release limit register associated with said receiver and said receiver processor providing an indication of a maximum number of data cells to be released from buffers in said receiver during said specified interval.

68. The apparatus according to claim 67, wherein said maximum number of data cells to be released from buffers in said receiver is dynamically adjustable.

69. The apparatus according to claim 67, wherein said receiver processor causes the transmission of the value of the difference between said received cell counter and said receiver buffer counter subtracted from the value in said transmitted cell counter to said transmitter when the value of said update release counter is equal to said release limit register, and wherein said transmitter processor receives and loads said difference value into said transmitter buffer counter.

70. The apparatus according to claim 66, wherein said transmitter processor enables transmission of data cells in said virtual connections of said link in a first mode, and inhibits data cell transmission over all connections of said link in a second mode.

71. The apparatus according to claim 70, wherein said first mode is defined by said transmitter buffer counter being less than said buffer limit register, and said second mode is defined by said transmitter buffer counter being equal to or greater than said buffer limit register.

72. The apparatus according to claim 66, wherein
said transmitter processor transmits a value of said transmitted cell counter to said receiver processor at a specified interval, and
said receiver processor resets said received cell counter equal to said transmitted cell counter value.

73. A dynamically responsive link-level buffer sharing apparatus, comprising:
a communications link for supporting a plurality of connections thereon and having a transmitter end and a receiver end;
a transmitter at said transmitter end of said link for transmitting data cells over said link according to dynamically adjusted transmission parameters; and
a receiver at said receiver end of said link, said receiver having a plurality of buffers for storing data cells received from said transmitter via said link for said connections according to dynamically adjusted reception parameters, said plurality of buffers comprising collectively a buffer pool,
wherein said receiver provides total buffer occupancy status information at the link level to said transmitter as data cells are received from said transmitter.

74. The apparatus according to claim 73, wherein said dynamically adjusted transmission and reception parameters are adjusted in response to changes in data cell transmission rate.

75. The apparatus according to claim 73, wherein said dynamically adjusted transmission and reception parameters are adjusted in response to pre-defined performance criteria.

76. A link-level buffer sharing apparatus, comprising:
a communications link having a transmitter end and a receiver end;
a transmitter at said transmitter end of said link for transmitting data cells over said link, said transmitter comprising
a counter for counting a number of data cells transmitted by said transmitter over said link to said receiver, said counter incrementing upon transmission of each data cell, and
operating logic operative to increment said counter; and
a receiver at said receiver end of said link, said receiver having a plurality of buffers for storing data cells received from said transmitter via said link,
wherein said receiver provides link-level buffer status information to said transmitter as data cells are received from said transmitter.

77. The apparatus according to claim 76, said communications link further comprising a plurality of virtual connections through which said data cells are transmitted from said transmitter to said receiver.

78. A link-level buffer sharing apparatus, comprising:
a communications link having a transmitter end and a receiver end;
a transmitter at said transmitter end of said link for transmitting data cells over said link; and
a receiver at said receiver end of said link, said receiver having a plurality of buffers for storing data cells received from said transmitter via said link, said receiver comprising
a stored cell counter for counting a number of data cells currently stored in said plurality of buffers, said stored cell counter incrementing upon storage of each data cell in a respective buffer and decrementing upon release of each data cell from a respective buffer, and
operating logic operative to increment and decrement said stored cell counter,
wherein said receiver provides link-level buffer status information to said transmitter as data cells are received from said transmitter.

79. The apparatus according to claim 78, said communications link further comprising a plurality of virtual connections through which said data cells are transmitted from said transmitter to said receiver.

80. The apparatus according to claim 78, said receiver further comprising:
a released cell counter for counting a number of data cells released from said plurality of buffers, said released cell counter incrementing upon release of each data cell from said respective buffer; and
operating logic operative to increment said released cell counter,
wherein said status information comprises a value of said third counter.

81. The apparatus according to claim 78, said receiver further comprising:
a received cell counter for counting a number of data cells received by said receiver from said transmitter over said link, said received cell counter incrementing upon receipt of each data cell from said transmitter; and
operating logic operative to increment said fourth counter,
wherein said status information comprises a value of said fourth counter.

82. A dynamically responsive link-level buffer sharing apparatus, comprising:
a communications link having a transmitter end and a receiver end;
a transmitter at said transmitter end of said link for transmitting data cells over said link according to dynamically adjusted transmission parameters; and
a receiver at said receiver end of said link, said receiver having a plurality of buffers for storing data cells received from said transmitter via said link according to dynamically adjusted reception parameters,
wherein said receiver provides link-level buffer status information to said transmitter as data cells are received from said transmitter, and
wherein said dynamically adjusted transmission and reception parameters are adjusted in response to pre-defined performance criteria.

* * * * *